(12) United States Patent
Mizoguchi et al.

(10) Patent No.: US 12,542,056 B2
(45) Date of Patent: Feb. 3, 2026

(54) VEHICLE TRAVELING CONTROL APPARATUS AND VEHICLE

(71) Applicant: SUBARU CORPORATION, Tokyo (JP)

(72) Inventors: Masato Mizoguchi, Tokyo (JP); Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 323 days.

(21) Appl. No.: 18/166,801

(22) Filed: Feb. 9, 2023

(65) Prior Publication Data

US 2023/0274637 A1     Aug. 31, 2023

(30) Foreign Application Priority Data

Feb. 28, 2022    (JP) .................................. 2022-030372

(51) Int. Cl.
| | |
|---|---|
| *G08G 1/052* | (2006.01) |
| *G08G 1/01* | (2006.01) |
| *G08G 1/017* | (2006.01) |

(52) U.S. Cl.
CPC ............. *G08G 1/052* (2013.01); *G08G 1/012* (2013.01); *G08G 1/017* (2013.01)

(58) Field of Classification Search
CPC ....... H04W 4/029; H04W 4/46; H04W 64/00; H04W 64/006; G01S 5/0009; G01S 5/0018; G01S 5/0027; G01S 5/0036; G01S 5/0072; G08G 1/012; G08G 1/0112; G08G 1/20; B60W 2556/45; B60W 2556/50; H04L 67/52; G01C 21/28
See application file for complete search history.

(56) References Cited

U.S. PATENT DOCUMENTS

| | | | |
|---|---|---|---|
| 2012/0293357 A1* | 11/2012 | Nishigaki | G01S 17/931 342/52 |
| 2016/0260328 A1* | 9/2016 | Mishra | G01S 13/931 |
| 2017/0099580 A1* | 4/2017 | Ko | H04W 64/00 |

(Continued)

FOREIGN PATENT DOCUMENTS

| | | |
|---|---|---|
| JP | 2005-227086 A | 8/2005 |
| JP | 2018-106701 A | 7/2018 |
| JP | 2019-021273 A | 2/2019 |

*Primary Examiner* — Fadey S. Jabr
*Assistant Examiner* — Mario C Gonzalez
(74) *Attorney, Agent, or Firm* — Rimon P.C.

(57) ABSTRACT

A vehicle traveling control apparatus includes a communicator and a processor. The communicator communicates with mobile terminals of occupants traveling in vehicles. The processor executes control using data received from the mobile terminals. The processor acquires position data received from the mobile terminals, generates, from the position data acquired, data indicating respective traveling speeds or respective changes in traveling speed, extracts mobile terminals assumed to be in the same vehicle based on a degree of correlation in terms of the traveling speeds or changes in traveling speed, estimates a size or a kind of the vehicle based on a difference between positions of the mobile terminals extracted, and controls traveling of the vehicles by estimating the position of the vehicle on the road based on the size or the kind of the vehicle estimated and the position data on the mobile terminals extracted.

8 Claims, 14 Drawing Sheets

(56) References Cited

U.S. PATENT DOCUMENTS

| | | | |
|---|---|---|---|
| 2018/0077538 A1* | 3/2018 | Matus | H04W 4/40 |
| 2019/0180610 A1* | 6/2019 | Liu | G06N 20/20 |
| 2020/0020121 A1* | 1/2020 | Rawashdeh | G06V 10/82 |
| 2020/0189588 A1* | 6/2020 | Aoki | B60W 30/10 |
| 2021/0263160 A1* | 8/2021 | Zhang | G08G 1/09 |

* cited by examiner

| KIND OF VEHICLE | VEHICLE WIDTH | FRONT-REAR LENGTH |
|---|---|---|
| PASSENGER CAR | 1.8 | 4 |
| TRUCK | 2.5 | 8 |
| MOTORCYCLE | 0.9 | 2.5 |
| PEDESTRIAN | 0.5 | 0.5 |

VEHICLE TRAVELING CONTROL APPARATUS AND VEHICLE

CROSS-REFERENCE TO RELATED APPLICATIONS

The present application claims priority from Japanese Patent Application No. 2022-030372 filed on Feb. 28, 2022, the entire contents of which are hereby incorporated by reference.

BACKGROUND

The disclosure relates to a vehicle traveling control apparatus and a vehicle.

Development has advanced on some kind of vehicles, including automobiles, that are able to travel under driving assist which assists driver's operations, or under automatic driving without the driver's operations.

Regarding the automatic driving including the driving assist, minimum pieces of data to be used in controlling traveling of a vehicle may include data on a current position of the vehicle and data on a traveling state of the vehicle. Furthermore, to prevent the vehicle from interfering with another vehicle, data such as a position of the other vehicle is to be used.

By collecting such pieces of data on multiple vehicles, a server apparatus provided for the automatic driving of a vehicle, or each vehicle itself, is expected to be able to so control traveling of the vehicle as to prevent interference between the vehicle and any other vehicles. Japanese Unexamined Patent Application Publication Nos. 2019-021273, 2018-106701, and 2005-227086 each disclose a technique of generating position data on a vehicle.

SUMMARY

An aspect of the disclosure provides a vehicle traveling control apparatus. The vehicle traveling control apparatus includes a communicator and a processor. The communicator is configured to communicate with mobile terminals of occupants traveling in one or more vehicles. The processor is configured to execute control using data received from the mobile terminals. The processor is configured to: acquire pieces of position data, the pieces of position data including respective pieces of position data received from the mobile terminals of the occupants traveling in the one or more vehicles; generate, from the respective pieces of position data on the mobile terminals acquired, data indicating respective traveling speeds or respective changes in traveling speed; extract, among the mobile terminals, two or more mobile terminals of two or more of the occupants, the two or more mobile terminals being assumed to be located in the same one vehicle among the one or more vehicles, based on a degree of correlation in terms of the respective traveling speeds or the respective changes in traveling speed based on the respective pieces of position data on the mobile terminals; estimate a size or a kind of the same one vehicle based on a difference between respective positions of the two or more mobile terminals extracted; and control traveling of the one or more vehicles by estimating a position of the same one vehicle on a road based on the size or the kind of the same one vehicle estimated and the respective pieces of position data on the two or more mobile terminals extracted.

An aspect of the disclosure provides a vehicle including a communicator and a processor. The communicator is configured to receive, by communication, data on respective positions of mobile terminals of occupants traveling in one or more other vehicles. The processor is configured to execute traveling control on the vehicle based on the data on the respective positions of the mobile terminals received. The processor is configured to execute at least a fifth process among: a first process of acquiring pieces of position data, the pieces of position data including respective pieces of position data received from the mobile terminals of the occupants traveling in the one or more other vehicles; a second process of generating, from the respective pieces of position data on the mobile terminals acquired, data indicating respective traveling speeds or respective changes in traveling speed; a third process of extracting, among the mobile terminals, two or more mobile terminals of two or more of the occupants, the two or more mobile terminals being assumed to be located in the same one other vehicle among the one or more other vehicles, based on a degree of correlation in terms of the respective traveling speeds or the respective changes in traveling speed based on the respective pieces of position data on the mobile terminals; a fourth process of estimating a size or a kind of the same one other vehicle based on a difference between the respective positions of the two or more mobile terminals extracted; and the fifth process of controlling traveling of the vehicle by estimating a position of the same one other vehicle on a road based on the size or the kind of the same one vehicle estimated and the respective pieces of position data on the two or more mobile terminals extracted.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
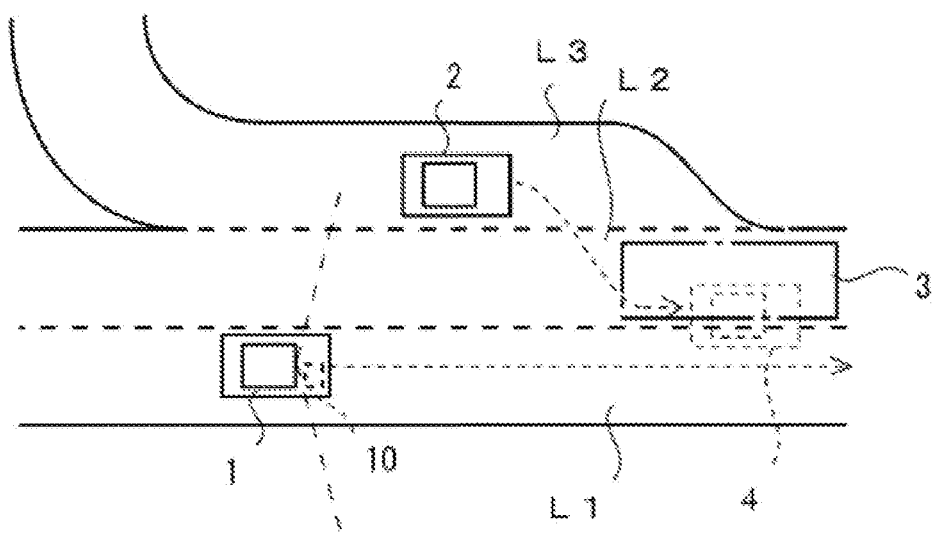
FIG. 1 is a diagram describing a traveling state of a vehicle to which one example embodiment of the disclosure is applicable.

Not all of vehicles actually traveling on a road may be equipped with global navigation satellite system (GNSS) receivers or other devices for detecting positions of the vehicles. For example, vehicles of recent times may be couplable to mobile terminals, and thus no GNSS receivers or no other similar devices may be provided in the vehicles themselves in some cases. In such cases, it is difficult for server apparatuses for automatic driving of vehicles, or individual vehicles, to acquire position data on the vehicles themselves actually traveling on the road.

In a case where it is difficult to acquire the position data on the vehicles actually traveling on the road, the server apparatuses or the vehicles may be able to execute control on the vehicles only in a state where the vehicles are visually recognizable.

Even if a vehicle supports automatic driving that is able to control traveling of the own vehicle with high accuracy, any control to avoid another vehicle having no position detection function is executable only after the other vehicle has become visually recognizable. Even if a vehicle supports automatic driving that is able to control traveling of the own vehicle with high accuracy, there is a possibility that the vehicle is forced to perform relatively sudden traveling control so as to avoid interference with another vehicle having no position detection function.

For example, in a case where a second vehicle having no position detection function is traveling on a merging point, a first vehicle traveling under automatic driving may be unable to recognize a traveling position of the second vehicle on a lane into which the second vehicle merges, unless an image of the second vehicle becomes capturable with an exterior camera or other devices of the first vehicle. Even in a case where a first vehicle under automatic driving is traveling along a lane adjacent to a lane into which a second vehicle having no position detection function is to merge, there is a possibility that the second vehicle can, upon merging, stray onto the adjacent lane from the lane into which the second vehicle merges. In such a case, the first vehicle under automatic driving is to perform avoidance control in response to the straying of the second vehicle, after an image of the second vehicle straying has been captured.

It is desirable to provide a vehicle traveling control apparatus and a vehicle that each make it possible to estimate data on a vehicle having no position detection function, such as a size or kind of the vehicle or a position of the vehicle on a road, in performing vehicle traveling control.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

FIG. 1 is a diagram describing a traveling state of a vehicle 1 to which an example embodiment of the disclosure is applicable.

FIG. 1 illustrates a merging section in which a side road L3 of one lane merges into a two-lane road. The vehicle 1 may be traveling along a passing lane L1 adjacent to a merging-side lane L2 of the two-lane road to which the side road L3 is coupled. The vehicle 1 may be about to pass through the merging section. In one embodiment, the vehicle 1 may serve as a "vehicle". The vehicle 1 may be an automobile, for example. Examples of the vehicle may further include a motorcycle, a personal mobility, a bus, and a truck. The vehicle may include a drive source such as an engine or a motor, and may travel by means of a drive force generated by the drive source. The vehicle may travel basically in accordance with operations performed by a driver who drives the vehicle. The vehicle may also be able to travel while assisting the driver's operations, or under automatic driving without the driver's operations. In the following description, traveling control based on automatic driving may include traveling control based on driving assist.

Referring to FIG. 1, another vehicle 2 may be traveling on the side road L3. The other vehicle 2 may be an automobile, for example. The other vehicle 2 may thereafter travel toward the merging-side lane L2 of the two-lane road and merge thereinto from the side road L3. The other vehicle 2 may be configured to travel basically in accordance with the driver's operations.

Figure 2:
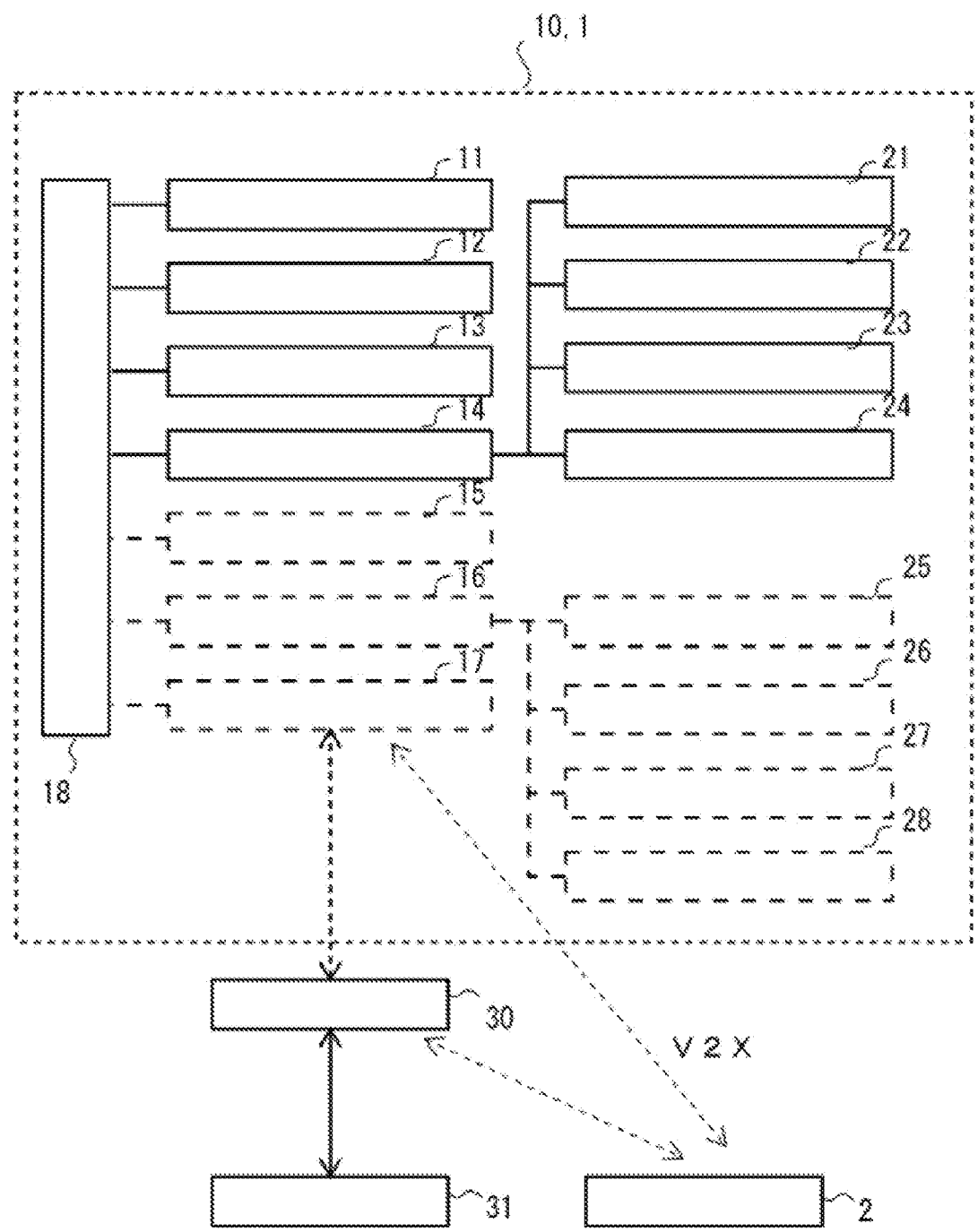
FIG. 2 is a block diagram of a control system of the vehicle in FIG. 1.

FIG. 2 is a block diagram of a control system 10 of the vehicle 1 in FIG. 1.

The control system 10 of the vehicle 1 in FIG. 2 may include control apparatuses including a traveling control apparatus 15 that executes automatic control. FIG. 2 illustrates the control apparatuses including a driving control apparatus 11, a steering control apparatus 12, a braking control apparatus 13, an operation detection apparatus 14, the traveling control apparatus 15, a detection control apparatus 16, and an external communication control apparatus 17. The control system 10 of the vehicle 1 may further include other control apparatuses including, for example, an air conditioning control apparatus, an occupant monitoring apparatus, a short-range communication apparatus, and an alarm apparatus. The control apparatuses may be coupled to a central gateway (CGW) 18 via cables. The CGW 18 may configure a vehicle network. The cables may be coupled to the CGW 18. The control apparatuses may be star-coupled or bus-coupled to the CGW 18. The vehicle network may be based on a standard such as a controller area network (CAN) or a local interconnect network (LIN). Alternatively, the vehicle network may be based on a general-purpose wired communication standard such as a local area network (LAN), a wireless communication standard, or a combination thereof. An identification (ID) may be assigned to each of the control apparatuses for distinction from the other control apparatuses. The control apparatuses may each input and output various pieces of data in packets with a destination ID and a sender ID added thereto. The CGW 18 may monitor the packets on the vehicle network and perform routing thereon. The CGW 18 may verify the packets against a list and control the routing.

The driving control apparatus 11 may control the drive source and a drive force transmission mechanism of the vehicle 1. The drive force transmission mechanism may include, for example, a decelerator and a central differential. The drive force transmission mechanism may control magnitudes of the drive forces to be transmitted to wheels of the vehicle 1 on an individual basis.

The steering control apparatus 12 may control a steering device that changes orientations of the front wheels of the vehicle 1. The vehicle 1 may change traveling direction in response to changes in orientation of the wheels.

The braking control apparatus 13 may control a braking device that brakes the wheels of the vehicle 1 on an individual basis. The braking device may control magnitudes of braking forces to be exerted on the wheels of the vehicle 1 on an individual basis.

Operation members may be coupled to the operation detection apparatus 14. The operation members may be provided in the vehicle 1 to allow an occupant of the vehicle 1 to perform operations related to traveling of the vehicle 1. The operation members may include, for example, a steering 21, an accelerator pedal 22, a brake pedal 23, and a shift lever 24. The operation detection apparatus 14 may detect, for example, whether an operation has been performed and an amount of the operation for each of the operation members 21 to 24, and may output operation data to the vehicle network.

Own vehicle sensors may be coupled to the detection control apparatus 16. The own vehicle sensors may be provided to detect a traveling state and a traveling environment of the vehicle 1. The own vehicle sensors may include, for example, a GNSS receiver 25, an exterior camera 26, a light detection and ranging (LiDAR) 27, and an acceleration sensor 28.

The GNSS receiver 25 may receive radio waves from unillustrated GNSS satellites and generate data on a current position at which the vehicle 1 equipped with the GNSS receiver 25 is located, and a current time. The GNSS receiver 25 may be able to receive ground waves or radio waves from a quasi-zenith satellite to thereby generate highly accurate data on the current position and the current time.

The exterior camera 26 may capture an image of the outside of the vehicle 1 which travels on a road, for example. The vehicle 1 may be provided with multiple exterior cameras 26. The multiple exterior cameras 26 may capture images of an environment around the vehicle 1 in forward, backward, rightward, and leftward directions. Images to be captured by the exterior cameras 26 may include an image of, for example, the other vehicle 2 located around the vehicle 1. The vehicle 1 may capture images of at least a forward side in the traveling direction of the vehicle 1 as illustrated, for example, with the exterior cameras 26.

The LiDAR 27 may scan with a laser the outside of the vehicle 1 which travels on a road, for example, and may generate outside-vehicle space data on the basis of a reflected wave of a laser beam. The outside-vehicle space data may include the image of, for example, the other vehicle 2 located around the vehicle 1. The exterior camera 26 and the LiDAR 27 may serve as sensors that detect the other vehicle 2 located around the vehicle 1.

The acceleration sensor 28 may detect accelerations in axial directions including a front-rear direction, a left-right direction, and an up-down direction of the vehicle 1, for example. In this case, the acceleration sensor 28 may be able to detect accelerations in a yaw direction, a roll direction, and a pitch direction of the vehicle 1.

The detection control apparatus 16 may output detection data available from these various own vehicle sensors 25 to 28 provided in the own vehicle to the vehicle network. The detection control apparatus 16 may generate data on the basis of the detection data, for example, detection data on the other vehicle 2 located around the own vehicle, and may output the generated data to the vehicle network.

The external communication control apparatus 17 may establish a wireless communication path to a base station 30 provided near, for example, a road outside the vehicle 1. The base station 30 may be a base station of a carrier, or may be a base station for advanced traffic information. The external communication control apparatus 17 may, via the base station 30, transmit and receive data to and from a server apparatus 31 or other apparatuses coupled to the base station 30. The server apparatus 31 may be provided in correspondence with the base station 30. By providing the base station 30 for 5G communication with a function of the server apparatus 31, it becomes possible for the external communication control apparatus 17 of the vehicle 1 to execute a high-speed and large-capacity communication with the server apparats 31 of the base station 30.

The external communication control apparatus 17 may establish a wireless communication path to another mobile body such as the other vehicle 2 by V2X communication. In one embodiment, the external communication control apparatus 17 may serve as a "communicator" of the vehicle.

The traveling control apparatus 15 may control the traveling of the vehicle 1.

The traveling control apparatus 15 may execute traveling control on the vehicle 1 based on driver's operations, traveling control on the vehicle 1 assisting the driver's operations, and traveling control under automatic driving without the driver's operations.

For example, the traveling control apparatus 15 may generate a control value used to assist a driver's operation on the basis of data from the operation detection apparatus 14, and may output the generated control value to the driving control apparatus 11, the steering control apparatus 12, and the braking control apparatus 13.

The traveling control apparatus 15 may, on the basis of data from the detection control apparatus 16 and high-precision map data, execute lane keep control to keep a traveling lane and preceding-vehicle following control to thereby generate and output a control value for automatic driving.

Thus, the traveling control apparatus 15 may serve as a traveling control processor that controls traveling of the vehicle 1 using at least detection results obtained by the own vehicle sensors 25 to 28.

Figure 3:
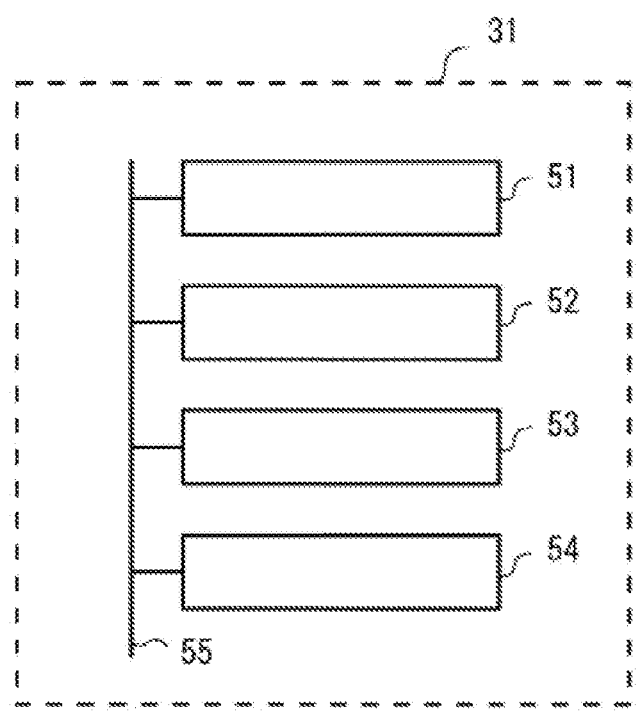
FIG. 3 is a block diagram of a server apparatus that controls vehicle traveling.

FIG. 3 is a block diagram of the server apparatus 31 that controls the traveling of the vehicle 1.

The server apparatus 31 in FIG. 3 may include a server communication device 51, a server timer 52, a server memory 53, a server CPU 54, and a server bus 55. The server communication device 51, the server timer 52, the server memory 53, and the server CPU 54 may be coupled to the server bus 55. In one embodiment, the server apparatus 31 may serve as a "vehicle traveling control apparatus".

The server communication device 51 may be coupled to a communication network such as the Internet. The server communication device 51 may transmit and receive data to and from, for example, the vehicle 1 traveling on a road, via the base station 30 coupled to the communication network, for example. In one embodiment, the server communication device 51 may serve as a "communicator" of the vehicle traveling control apparatus. The server communication device 51 may be communicable with the vehicle 1 to remotely control or assist the traveling of the vehicle 1.

The server timer 52 may measure a time and a time period. The time of the server timer 52 may be calibrated by a time based on radio waves from the unillustrated GNSS satellites. The time of the server timer 52 in this case may synchronize with the time of the vehicle 1.

The server memory 53 may hold a program to be executed by the server CPU 54, and data. The server memory 53 may include, for example, a nonvolatile semiconductor memory, a hard disk drive (HDD), or a random access memory (RAM).

The server CPU 54 may read the program held by the server memory 53 and execute the program. This enables a server processor to be implemented. The server CPU 54 as the server processor may manage operation of the server apparatus 31. In one embodiment, the server CPU 54 may serve as a "processor" of the vehicle traveling control apparatus.

For example, the server CPU 54 may execute vehicle traveling control using received data to remotely control the traveling of the vehicle 1. In this case, the server CPU 54 may collect data related to traveling of vehicles on roads, for example, and may control, on the basis of collected data, traveling of the vehicle 1 communicating with the server CPU 54 to enable each vehicle 1 to travel with safety and security. In controlling each vehicle 1, the server CPU 54 may use data on the traveling state of the other vehicle 2. There may also be, for example, pedestrians on roads. The server CPU 54 may collect and estimate as much data as possible regarding the vehicles 1 that are not communicating with the server CPU 54, and may use the estimated data on such vehicles 1 to control traveling of the vehicle 1 communicating with the server CPU 54.

Figure 4:
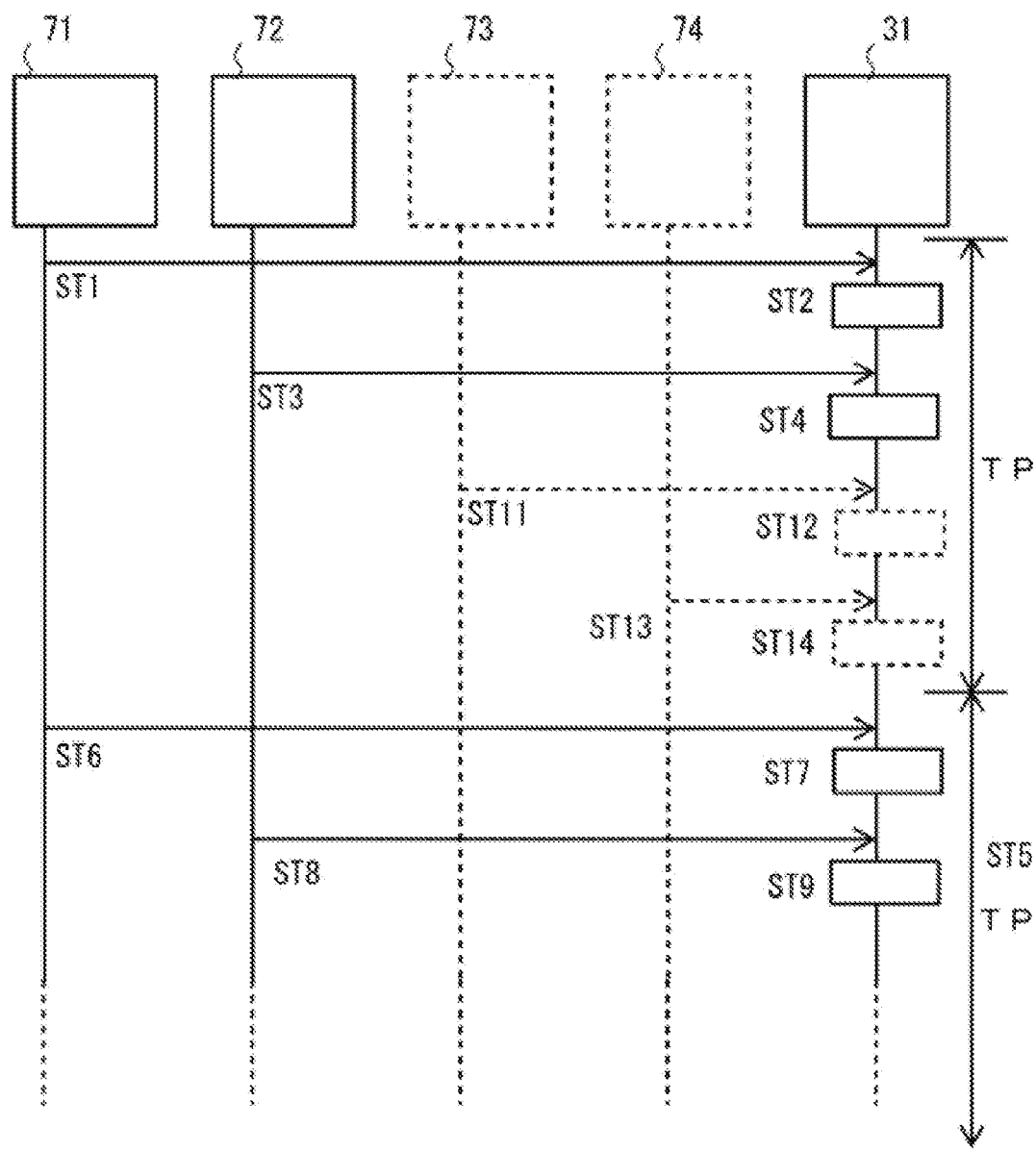
FIG. 4 is a timing chart of data collection and traveling control to be performed by the server apparatus in FIG. 3 that controls vehicle traveling in one example embodiment of the disclosure.

FIG. 4 is a timing chart of data collection and traveling control to be performed by the server apparatus 31 in FIG. 3 that controls vehicle traveling in the first example embodiment of the disclosure.

FIG. 4 illustrates the server apparatus 31, a first vehicle 71, a second vehicle 72, a first mobile terminal 73, and a second mobile terminal 74. The first vehicle 71 and the second vehicle 72 may each be an example of the vehicle 1, and may each be an automobile, for example. The time may pass from the top to the bottom.

As illustrated in steps ST1 and ST6 in FIG. 4, the first vehicle 71 may cyclically transmit vehicle data on the own vehicle to the server apparatus 31. The vehicle data on the first vehicle 71 may include, for example, a current position, a current speed, and a current time of the first vehicle 71, images of the outside of the first vehicle 71 captured by the first vehicle 71, the outside-vehicle space data, and data on another vehicle 2 detected around the first vehicle 71 which is the own vehicle.

As illustrated in steps ST3 and ST8 in FIG. 4, the second vehicle 72 may cyclically transmit vehicle data on the own vehicle to the server apparatus 31. The vehicle data on the second vehicle 72 may include, for example, a current position, a current speed, and a current time of the second vehicle 72, images of the outside of the second vehicle 72 captured by the second vehicle 72, the outside-vehicle space data, and data on another vehicle 2 detected around the second vehicle 72 which is the own vehicle.

The server apparatus 31 may store and accumulate the vehicle data received from the vehicles 71 and 72 (the vehicles 1) in the server memory 53 (steps ST2, ST4, ST7, and ST8).

Using the data accumulated in the server memory 53, the server apparatus 31 may execute traveling control by means of a server for each predetermined control cycle TP, and may thereby generate a traveling control value as traveling control data for each vehicle 1. The server apparatus 31 may transmit the traveling control value to each of the first vehicle 71 and the second vehicle 72. The first vehicle 71 may control the traveling of the own vehicle by using the traveling control value for the own vehicle received cyclically from the server apparatus 31. The second vehicle 72 may control the traveling of the own vehicle by using the traveling control value for the own vehicle received cyclically from the server apparatus 31. The first vehicle 71 and the second vehicle 72 each traveling while communicating with the server apparatus 31 are thus able to keep traveling with safety and security, under the traveling control by the server apparatus 31, so as not to interfere with, for example, the other vehicle 2.

Figure 5:
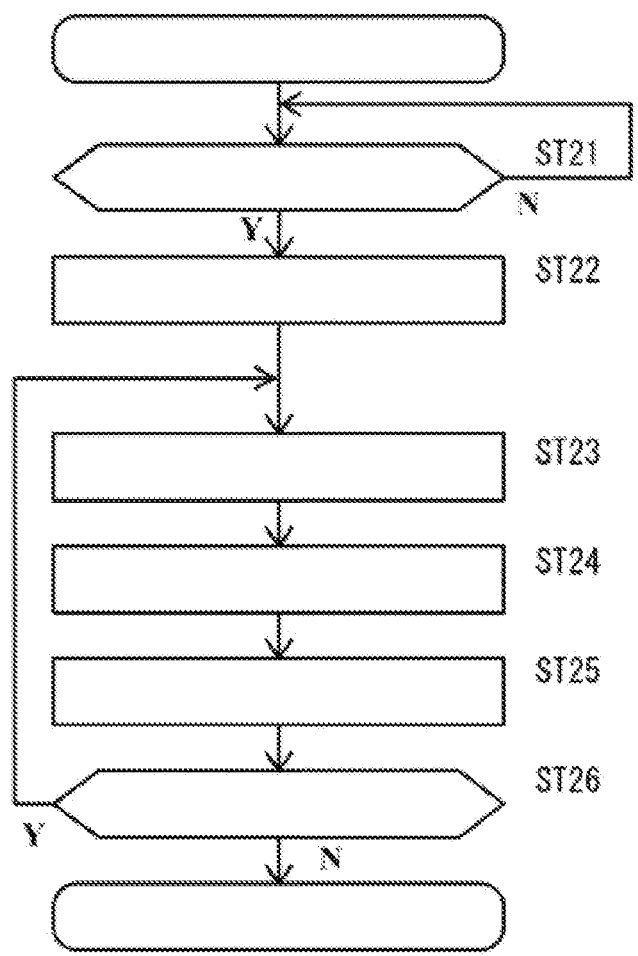
FIG. 5 is a flowchart of traveling control to be performed by the server apparatus in FIG. 3.

FIG. 5 is a flowchart of the traveling control by the server apparatus 31 in FIG. 3.

The server CPU 54 of the server apparatus 31 may execute the traveling control in FIG. 5 repeatedly at each predetermined control cycle TP.

In step ST21, the server CPU 54 may determine whether a control timing based on the predetermined control cycle TP has arrived. If the control timing has not arrived, the server CPU 54 may repeat this process. If the control timing has arrived, the server CPU 54 may cause the flow to proceed to step ST22.

In step ST22, using the vehicle data on multiple vehicles 1 communicating with the server communication device 51, the server CPU 54 may perform mapping of traveling positions of the vehicles 1 that have been found from the collected data. In performing the mapping, the server CPU 54 may read high-precision map data together with the vehicle data and other data from the server memory 53. In this case, for example, the server CPU 54 may generate a diagram for each road or each lane included in the high-precision map data on an allocated region, and may map the current positions of the vehicles 1. The server CPU 54 may also map, on the diagram, future traveling positions of the vehicles 1 based on their respective speeds.

In step ST23, the server CPU 54 may select one vehicle 1 communicating with the server apparatus 31 among the vehicles 1 mapped on the diagram.

In step ST24, the server CPU 54 may generate a traveling control value for controlling the traveling of the selected vehicle 1. Here, the traveling control value may serve as an instruction or a request to keep the current traveling, or to accelerate or decelerate the vehicle or change lanes, for example. The server CPU 54 may generate a traveling control value for acceleration or deceleration to allow a predetermined distance to be kept between the vehicle 1 and another preceding vehicle 2 on the same diagram, for example.

In step ST25, the server CPU 54 may transmit the traveling control value generated in step ST24 to the selected vehicle 1. The traveling control value may be transmitted from the server communication device 51 of the server apparatus 31 to the external communication control apparatus 17 of the selected vehicle 1 via the base station 30. For example, in a case where the traveling control value is intended to keep the predetermined distance between the vehicle 1 and the other preceding vehicle 2, the vehicle 1 may, upon receiving the traveling control value, so control the traveling of the own vehicle as to follow the other preceding vehicle 2 while keeping the predetermined distance therefrom.

In step ST26, the server CPU 54 may determine whether any vehicle remains unprocessed. If any vehicle remains unprocessed, the server CPU 54 causes the flow to return to step ST23. The server CPU 54 repeats the processes from step ST23 to step ST26 for all of the vehicles 1 communicating with the server communication device 51. When there is no longer any vehicle remaining unprocessed, the server CPU 54 may end this control. The server CPU 54 may stop until the next control cycle TP arrives.

In such a manner, the vehicle 1 traveling under automatic driving including driving assist may transmit the detection results obtained by the own vehicle sensors 25 to 28 including, for example, the current position, speed, and images, to the server apparatus 31 cyclically, and may receive the traveling control value from the server apparatus 31 cyclically. The vehicle 1 is thus able to control the traveling of the own vehicle.

In a case where the other vehicle 2 traveling on the side road L3 in FIG. 1 is not configured to communicate with the server apparatus 31 or is configured to travel only in accordance with the driver's operations, it is difficult for the server apparatus 31 to collect vehicle data from the other vehicle 2 traveling on the side road L3. Further, not all of the vehicles 1 actually traveling on a road may be equipped with the GNSS receivers 25 or other devices for detecting the positions of the own vehicles. For example, the vehicles 1 of recent times may be couplable to mobile terminals 40, and thus no GNSS receivers 25 or no other similar devices may be provided in the vehicles 1 themselves in some cases. In such cases, it is difficult for the server apparatus 31 for automatic driving of the vehicles 1 to acquire position data on all the vehicles 1 actually traveling on the road.

To improve safety in controlling traveling of the vehicles 1, current positions of all the vehicles 1 actually traveling on the road are to be obtained. In a case where any vehicle 1 that is not recognized by the server apparatus 31 is actually traveling on the road, sufficiently safe and secure traveling may not always be achieved for every vehicle 1 traveling under control by the server apparatus 31.

For example, referring to FIG. 1, in a case where another vehicle 2 having no position detection function is about to merge from the side road L3 into the road on which the vehicle 1 is traveling under automatic driving, the vehicle 1 traveling under automatic driving is to become able to capture an image of the other vehicle 2 with the exterior camera 26, for example. Even if the vehicle 1 under automatic driving is traveling along the passing lane L1 adjacent to the lane L2 into which the other vehicle 2 is to merge, there is a possibility that the other vehicle 2 can stray onto the passing lane L1 from the lane L2 upon merging thereinto. In such a case, the vehicle 1 under automatic driving is to perform urgent avoidance control in response to the straying of the other vehicle 2 after the image of the other vehicle 2 straying has been captured.

Thus, even if the vehicle 1 supports highly accurate automatic driving, any control to avoid the other vehicle 2 having no position detection function is executable only after the other vehicle 2 has become visually recognizable from the own vehicle. Even if the vehicle 1 supports automatic driving that is able to control the traveling of the own vehicle with high accuracy, there is a possibility that the vehicle 1 is forced to perform relatively sudden traveling control to avoid interference with the other vehicle 2 having no position detection function.

Accordingly, in performing traveling control on the vehicle 1, data on the vehicle 2 having no position detection function, such as the size or kind of the vehicle 2 or the position of the vehicle 2 on the road, is to be estimated and used for traveling control on the vehicle 1.

To this end, position data on the mobile terminal 40 carried by an occupant may be usable for vehicle traveling control.

Figure 6:
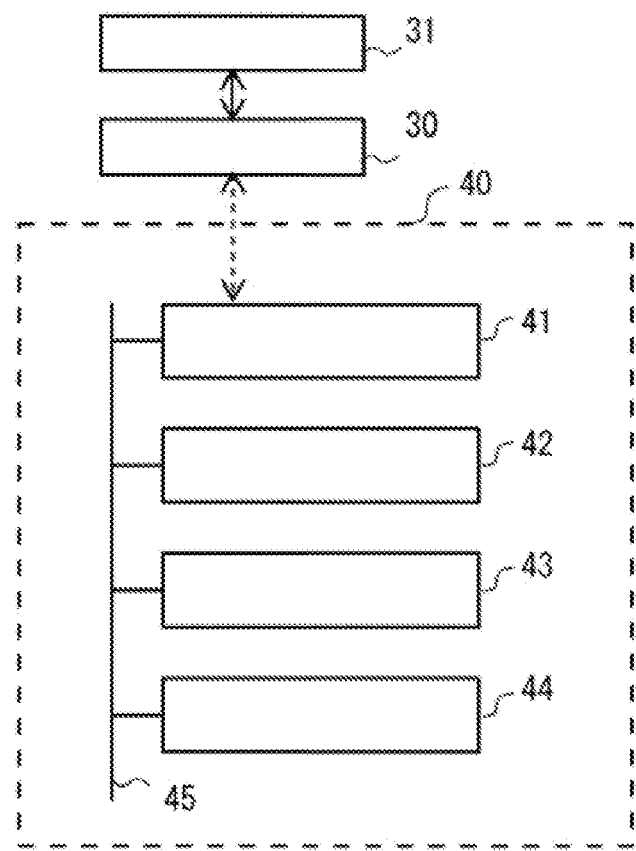
FIG. 6 is a block diagram of a mobile terminal communicable with the server apparatus.

FIG. 6 is a block diagram of the mobile terminal 40 communicable with the server apparatus 31.

The mobile terminal 40 in FIG. 6 may include a terminal communication device 41, a terminal GNSS receiver 42, a terminal memory 43, a terminal CPU 44, and a terminal bus 45. The terminal communication device 41, the terminal GNSS receiver 42, the terminal memory 43, and the terminal CPU 44 may be coupled to the terminal bus 45.

The terminal communication device 41 may establish a wireless communication path to the base station 30. The terminal communication device 41 may transmit and receive data to and from, for example, the server apparatus 31 via a communication network coupled to the base station 30.

The terminal GNSS receiver 42 may receive radio waves from the unillustrated GNSS satellites and may generate data on a current position and a current time of the mobile terminal 40 equipped with the GNSS receiver 42. The mobile terminal 40 may have a detection function providing position accuracy as high as that obtainable with a GNSS receiver provided in the vehicle 1. In such a case, the mobile terminal 40 provides improved position accuracy.

The terminal memory 43 may hold a program to be executed by the terminal CPU 44, and data. The terminal memory 43 may include, for example, a nonvolatile semiconductor memory, an HDD, or a RAM.

The terminal CPU 44 may read the program held by the terminal memory 43 and execute the program. This enables a terminal processor to be implemented. The terminal CPU 44 as the terminal processor may manage operation of the mobile terminal 40.

Such a mobile terminal 40 may be carried into, for example, a compartment of the vehicle 1 by any of occupants, including the driver, of the vehicle 1. Upon execution of a predetermined program by the terminal CPU 44, the mobile terminal 40 is able to transmit position data of its own to the server apparatus 31. In steps ST11 to ST14 in FIG. 4, the first mobile terminal 73 and the second mobile terminal 74 may transmit data such as the position obtained by the mobile terminals 40 to the server apparatus 31, and the server apparatus 31 may store and accumulate the data. In this case, the server apparatus 31 as the vehicle traveling control apparatus may receive and accumulate the vehicle data from each vehicle 1, and may also receive and accumulate the position data from each mobile terminal 40. The server apparatus 31 is able to communicate with the mobile terminals 40 of occupants traveling in the vehicles 1 by means of the server communication device 51 as the communicator, and to execute control using the data received from the mobile terminals 40, such as the positions of the mobile terminals 40.

Figure 7:
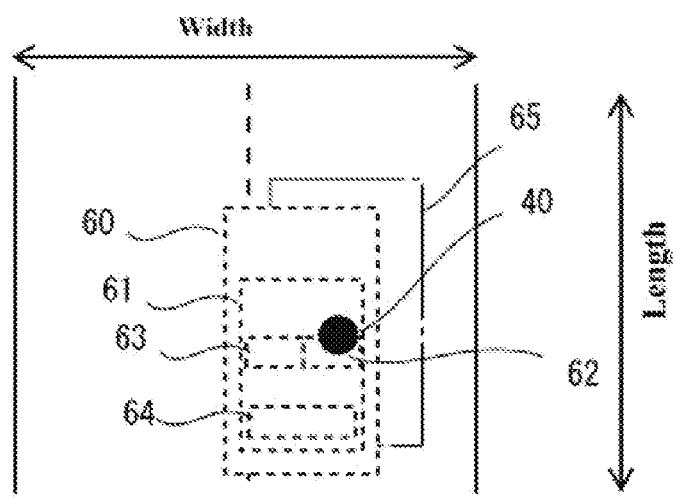
FIG. 7 is a diagram describing a position of a vehicle on a road, as a piece of vehicle data that may be estimated on the basis of a single mobile terminal.

FIG. 7 is a diagram describing a position of a vehicle 60 on a road, as a piece of vehicle data to be estimated on the basis of a single mobile terminal 40. The vehicle 60 may be an automobile, for example.

As indicated in broken lines in FIG. 7, the vehicle 60 may be traveling along a right lane on a two-lane road, with a portion of the vehicle 60 sticking out into a region within the left lane. The vehicle 60 may include a compartment 61 with multiple seats including a driver's seat 62, a front passenger seat 63, and a rear passenger seat 64. The driver may be seated in the driver's seat 62 with his/her mobile terminal 40. In the vehicle 60 in such a traveling state, the mobile terminal 40 may detect its own position and transmit the position data to the server apparatus 31. The server CPU 54 of the server apparatus 31 estimates the size of the vehicle 60 and the position of the vehicle 60 on the road on the basis of the position data on the mobile terminal 40. As a result, there is a possibility that at the server apparatus 31, the vehicle 60 is estimated to be traveling along the right lane, as indicated by a frame 62 in alternate long and short dashed lines in FIG. 7. In this case, the server CPU 54 estimates the position of the vehicle 60 on the road on the assumption that the mobile terminal 40 is located at the center of the vehicle 60. The size of the vehicle 60 and the position thereof on the road that the server CPU 54 is able to estimate on the basis of the position data on a single mobile terminal 40 are likely to include large error in a road width direction ("Width") and a road extension direction ("Length") relative to the position at which the vehicle 60 is actually traveling. Besides, it may be difficult for many of the mobile terminals 40 to provide position accuracy as high as that obtainable with the highly accurate GNSS receiver 25 used in the vehicle 1 that is able to be automatically driven.

If the server apparatus 31 executes traveling control on the unillustrated vehicle 1 traveling along, for example, the left lane on the basis of such an estimation result, there is a possibility that the vehicle 1 interferes with the vehicle 60 traveling with a portion thereof sticking out into a region within the left lane, even if the vehicle 1 keeps the lane.

As described above, if vehicle data is estimated on the basis of a single mobile terminal 40, the estimated vehicle data is likely to include error. Vehicle data based on the position data on the mobile terminal 40 is to be estimated in a more reliable manner.

Figure 8:
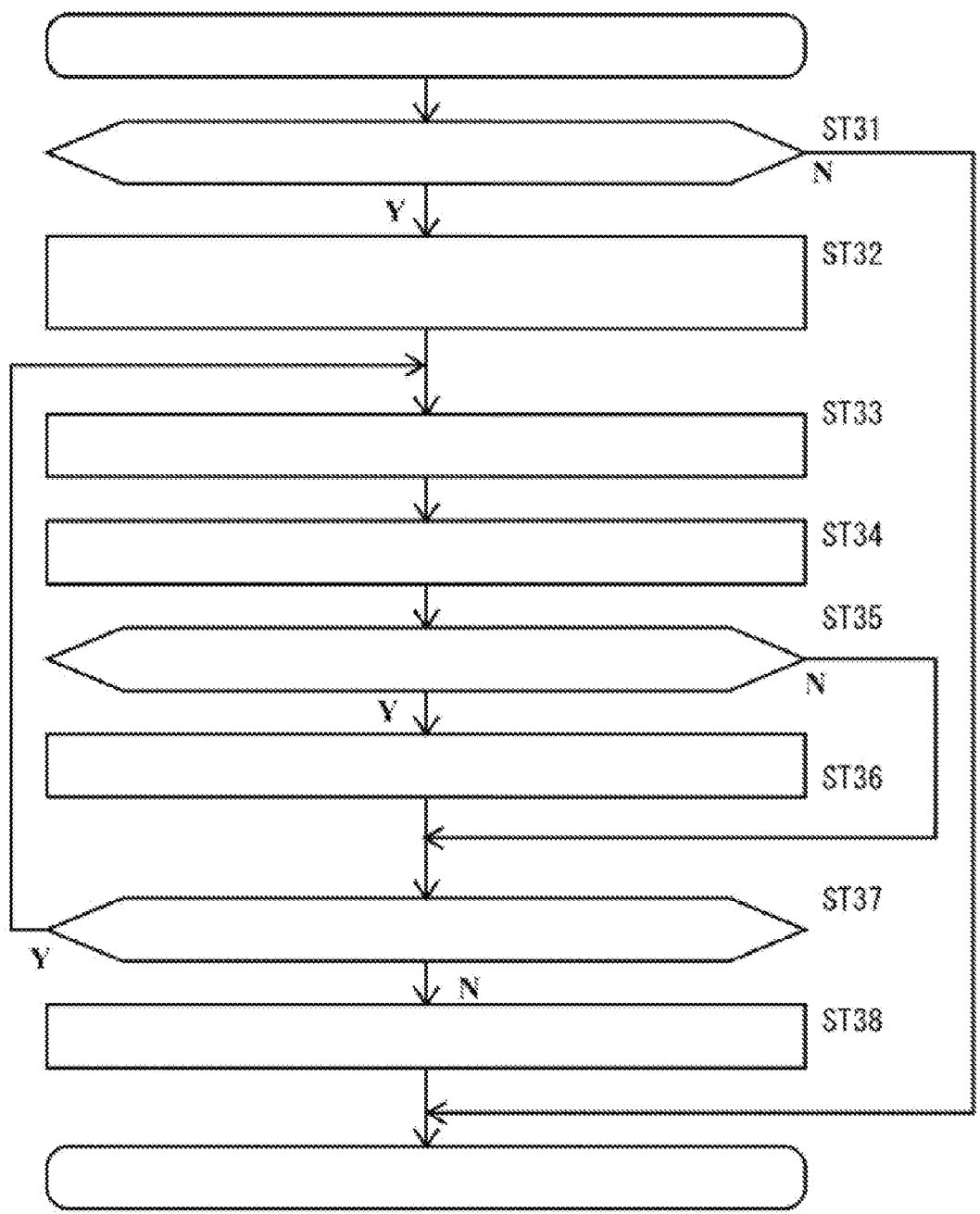
FIG. 8 is a flowchart of vehicle estimation control in one example embodiment of the disclosure.

FIG. 8 is a flowchart of vehicle estimation control in the first example embodiment of the disclosure.

The server CPU 54 may repeatedly execute the vehicle estimation control in FIG. 8 as a partial process of step ST22 in FIG. 5, for example.

In step ST31, the server CPU 54 may determine, on the basis of pieces of data that have been stored and accumulated in, for example, the server memory 53, whether data such as position data has been received from any mobile terminal 40. In a case where the data has been received from at least one mobile terminal 40 (step ST31: Y), the server CPU 54 may cause the flow to proceed to step ST32. In a case where no data has been received from any mobile terminal 40, the server CPU 54 may end this control.

In step ST32, the server CPU 54 generates data indicating respective traveling speeds and respective changes in traveling speed for the mobile terminals 40 and for the vehicles on the basis of the pieces of data that have been received and accumulated by the server apparatus 31. The pieces of data that have been received by the server apparatus 31 may include pieces of vehicle data from the vehicles 1, as well pieces of data such as position data on the mobile terminals 40. The vehicle data may include position data on the own vehicle detected by each vehicle 1. On the basis of the pieces of position data on the mobile terminals 40 that have been accumulated for individual mobile terminals 40, the server CPU 54 may generate data indicating a traveling speed and a change in traveling speed for relevant one of the mobile terminals 40. On the basis of the pieces of position data on the vehicles 1 that have been accumulated for individual vehicles 1, the server CPU 54 may generate data indicating a traveling speed and a change in traveling speed for relevant one of the vehicles 1. The server CPU 54 is thereby able to generate data indicating respective traveling speeds or respective changes in traveling speed from the respective pieces of position data on the mobile terminals 40 that have been acquired.

The server CPU 54 may execute a similar process by receiving speeds measured at the terminal GNSS receivers 42 of the mobile terminals 40.

Some of the terminal GNSS receivers 42 may be configured not only to calculate position on the basis of GNSS radio waves received but also to obtain the speed of the mobile terminal 40 on the basis of the degree of a Doppler effect generated in the GNSS radio waves being received. In this case, the mobile terminal 40 may transmit the data on the speed based on the Doppler effect to the server apparatus 31 together with the position data. In this case, it is possible for the server apparatus 31 to use the speed obtained at the terminal GNSS terminal 42 in performing the process, without differentiating the position.

In step ST33, the server CPU 54 may select one of the mobile terminals 40.

In step ST34, the server CPU 54 may determine a degree of correlation of traveling of the selected mobile terminal 40 with the other mobile terminals 40 and the vehicles 1. The server CPU 54 has generated in step ST32 the data indicating the respective traveling speeds and the respective changes in traveling speed for individual mobile terminals 40 and for individual vehicles 1. In a case where the respective traveling speeds and the respective changes in traveling speed overlap with each other, the degree of correlation of traveling is the highest. In a case where the shapes of envelopes resulting from the change in speed are similar to each other, the degree of correlation of traveling is medium. In a case where timings of extreme points included in the shapes of the envelopes coincide with each other, the degree of correlation of traveling increases. In a case where the timings of the extreme points included in the shapes of the envelopes are greatly different, the degree of correlation of traveling is low. In a case where the shapes of the envelopes are different, the degree of correlation of traveling is the lowest. The server CPU 54 may determine the degree of correlation of traveling of the selected mobile terminal 40 with the other mobile terminals 40 and with the vehicles 1 on the basis of the respective traveling speeds and the respective changes in traveling speed in such a manner. The mobile terminals 40 that have a high degree of correlation of traveling with each other are assumed to be located in the same vehicle 1.

As targets of determination of the degree of correlation of traveling with the selected mobile terminal 40, the server CPU 54 may select only some of the other mobile terminals 40 whose differences in position from the selected mobile terminal 40, that is, whose distances from the selected mobile terminal 40, are less than or equal to a predetermined threshold. It is thus possible for the server CPU 54 to exclude the rest of the other mobile terminals 40 from consideration of the degree of correlation with the selected mobile terminal 40.

The server CPU 54 may compare envelopes resulting from changes in position, instead of comparing envelopes resulting from changes in speed, or may combine those two kinds of comparisons with each other.

Note that in many cases, accuracy of the position of the mobile terminal 40 in absolute value may be lower than that obtainable with the GNSS receiver provided in the vehicle 1. Accordingly, in determining a degree of similarity of traveling between the mobile terminals 40 or between the mobile terminal 40 and the vehicle 1, for example, not only a degree of similarity of changing positions but also a degree of similarity of traveling speed may be determined. Even if the positions of the mobile terminals while traveling may continuously include error, the error is expected to be reduced by considering the traveling speed therebetween.

In step ST35, the server CPU 54 may determine whether there is a correlation. The mobile terminals 40 that are assumed to be located in the same vehicle 1 may be determined to have a correlation. For the mobile terminals 40 that are located in different vehicles 1 traveling next to each other along the front-rear direction, timings of the extreme points included in the envelops differ from each other. Such mobile terminals 40 may thus be determined to have no correlation. If there is any mobile terminal 40 or any vehicle 1 that is determinable to have a correlation with the selected mobile terminal 40 (step ST35: Y), the server CPU 54 causes the flow to proceed to step ST36. Otherwise (step ST35: N), the server CPU 54 may skip step ST36 and cause the flow to proceed to step ST37.

In step ST36, the server CPU 54 may perform grouping of the mobile terminals 40 or the vehicles 1 that are assumed to have a correlation. The mobile terminals 40 that are assumed to be located in the same vehicle 1 are thereby extracted. Also, the vehicle 1 in which those mobile terminals 40 are assumed to be located is extracted. The server CPU 54 may store group data on the extracted mobile terminals 40 and the extracted vehicle 1 in the server memory 53 in such a manner as to be distinguishable from other groups.

In step ST37, the server CPU 54 may determine whether there is any mobile terminal 40 remaining unprocessed. If there is any mobile terminal 40 remaining unprocessed, the server CPU 54 may cause the flow to return to step ST33. The server CPU 54 may repeat the processes from step ST33 to step ST37 until there is no longer any mobile terminal 40 remaining unprocessed. When there is no longer any mobile terminal 40 remaining unprocessed, the server CPU 54 may cause the flow to proceed to step ST38. Normally, at this point in time, pieces of data on multiple groups may be storable in the server memory 53 in such a manner as to be distinguishable from each other.

In step ST38, the server CPU 54 may estimate and generate vehicle data for each group. The vehicle data to be generated may include data on the kind, size, and position on the road for the vehicle 1 in which the mobile terminals 40 of relevant one of the groups are located. The server CPU 54 may select pieces of data on the groups one by one, and estimate and generate the vehicle data for each group. The server CPU 54 may store the generated vehicle data in the server memory 53 in association with relevant one of the groups.

Thereafter, the server CPU 54 may end this control. As a result, the server memory 53 holds pieces of data on the kind and the size of the vehicle 1 and the position of the vehicle 1 on the road that have been estimated on the basis of the data received from the mobile terminals 40. The server CPU 54 may perform mapping by using these pieces of data as the vehicle data on the vehicle 1 estimated on the basis of the mobile terminals 40, as with the vehicle data received from the vehicle 1 and accumulated in the server memory 53. The vehicle 1 from which no vehicle data has been received by the server apparatus 31 is thereby mapped on the diagram under reliability achieved by estimation based on the mobile terminals 40. This makes it possible for the server CPU 54 to generate, on the basis of the mapping, the traveling control values that help to provide safety and security in traveling of the vehicles 1 including the vehicle 1 from which no vehicle data has been received by the server apparatus 31.

Figure 9:
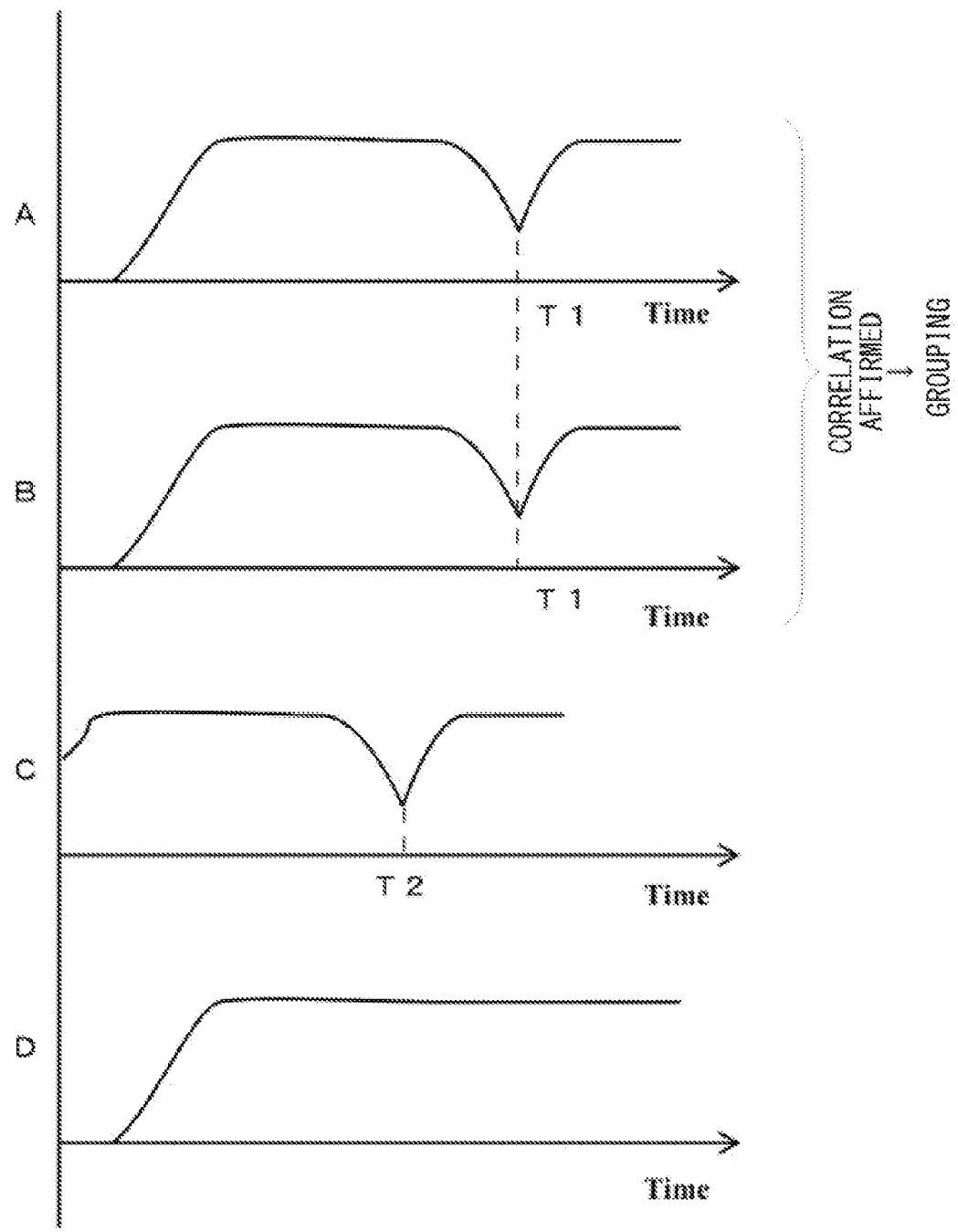
FIG. 9 is a diagram describing determination of a degree of correlation and grouping based on position data on mobile terminals.

FIG. 9 is a diagram describing determination of the degree of correlation and grouping based on the position data on the mobile terminals 40.

For example, in step ST34 in FIG. 8, the server CPU 54 may determine the degree of correlation based on the position data on the mobile terminals 40.

FIG. 9 illustrates envelopes A to D of speed based on respective pieces of position data on four mobile terminals 40. The horizontal axis represents time.

The envelopes A to C in FIG. 9 each indicate that the vehicle first accelerates, then travels at a constant speed, and thereafter slightly decelerates. In contrast, the envelope D indicates that the vehicle continues to travel at a constant speed after accelerating. Accordingly, it is determinable that the mobile terminal 40 of the envelope D is located in a vehicle 1 different from that in which the mobile terminals 40 of the envelopes A to C are each located, and is thus low in degree of correlation.

Furthermore, a deceleration timing T2 of the envelope C is different from a deceleration timing T1 of each of the envelopes A and B. Accordingly, it is determinable that the mobile terminal 40 of the envelope C is located in a vehicle 1 different from that in which the mobile terminals 40 of the envelopes A and B are each located, and is thus relatively low in degree of correlation.

In contrast, the deceleration timing T1 of the envelope B coincides with the deceleration timing T1 of the envelope A. Accordingly, it is determinable that the mobile terminal 40 of the envelope B is located in the same vehicle 1 as that in which the mobile terminal 40 of the envelope A is located, and is thus relatively high in degree of correlation.

By determining the degree of correlation based on comparison between the traveling speeds and changes thereof in such a manner, it is possible for the server CPU 54 to determine whether multiple mobile terminals 40 are located in the same vehicle 1.

The server CPU 54 may determine that there is a correlation between the mobile terminal 40 of the envelope A and the mobile terminal 40 of the envelope B that have been determined to be high in degree of correlation, and may group those mobile terminals 40.

Here, the description has been made on the assumption that all the envelopes A to D are derived from the mobile terminals 40. However, a similar description applies to a case where one or more of the envelopes A to D are derived from one or more vehicles 1. A vehicle 1 and any mobile terminal 40 located in the vehicle 1 are determinable to have a correlation, and may thus be grouped. In this case, on the basis of the degree of correlation with traveling speeds or changes in traveling speed in the position data on the vehicles 1, the server CPU 54 is able to extract the vehicle 1 in which occupants carrying relevant ones of the mobile terminals 40 are located.

Figure 10:
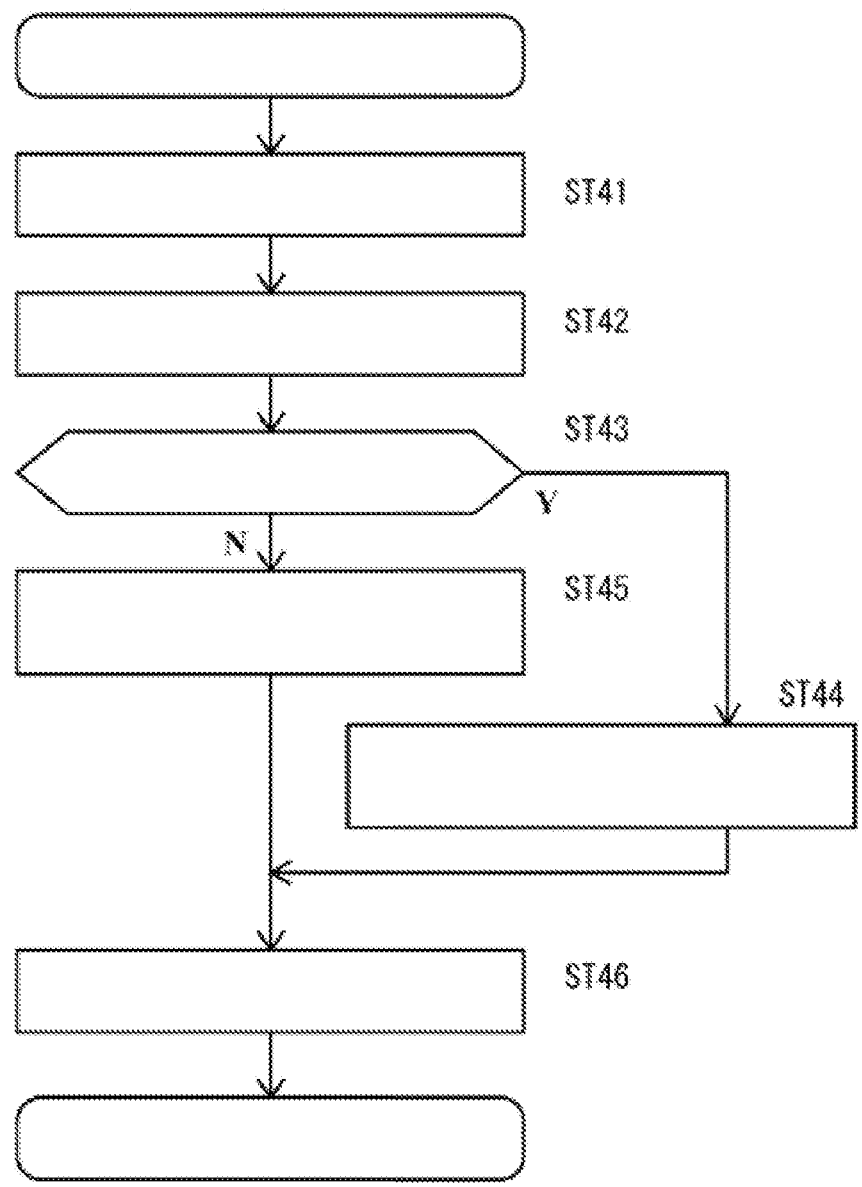
FIG. 10 is a flowchart of the vehicle data estimation control.

FIG. 10 is a flowchart of the vehicle data estimation control.

To estimate the vehicle data for each group in step ST38 in FIG. 8, for example, the server CPU 54 may repeatedly execute the vehicle data estimation control in FIG. 10 for each group.

In step ST41, the server CPU 54 may acquire data on a group from the server memory 53. The server memory 53 may hold data on each group of mobile terminals 40 having a correlation, for example.

In step ST42, the server CPU 54 may estimate a reference position of the vehicle for each group by calculation. The server CPU 54 may calculate the reference position of the vehicle for each group on the basis of a difference between the positions of the mobile terminals 40 included in the group, for example. The mobile terminals 40 may be located in the compartment 61 of the vehicle 1, for example. It is assumable that the mobile terminals 40 are distributed to different seats in the compartment 61 of the vehicle 1. In this case, the difference between the positions of the mobile terminals 40 may correspond to a distribution of the seats provided in the compartment 61 of the vehicle 1. The server CPU 54 may, for example, calculate an average value of the positions of all the mobile terminals 40 included in the group, and may estimate a position corresponding to the calculated average value as the reference position of the vehicle. Such a reference position of the vehicle is highly likely to be a position within the compartment 61 of the vehicle 1. The reference position may be used as a center position of the vehicle 1.

In step ST43, the server CPU 54 may determine whether any vehicle such as the vehicle 1 is included in the group. Any vehicle 1 having a high degree of correlation with the mobile terminals 40 in the group in terms of speed and a change in the speed may be included in the group. If data on such a vehicle 1 is included, the server CPU 54 may determine that a vehicle is included (step ST43: Y), and may cause the flow to proceed to step ST44. If no vehicle is included (step ST43: N), the server CPU 54 may cause the flow to proceed to step ST45.

In step ST44, on the basis of the vehicle data on the vehicle included in the group, the server CPU 54 estimates the kind and the size of the vehicle in which the mobile terminals 40 are located. For traveling control, the server apparatus 31 is to distinguish each vehicle 1 communicable with the server apparatus 31 from the other vehicles 2. The server apparatus 31 may thus hold, as the data on each vehicle 1 communicable with the server apparatus 31, data on the kind, the shape, and the size of the vehicle 1 in the server memory 53. In this case, it is possible for the server apparatus 31 to acquire the data on the kind and the size of the vehicle from the server memory 53 using the vehicle data on the vehicle included in the group. Thereafter, the server CPU 54 may cause the flow to proceed to step ST46.

In step ST45, on the basis of a difference between the positions of the mobile terminals 40 included in the group, the server CPU 54 estimates the kind and the size of the vehicle in which those mobile terminals 40 are located. In this case, any vehicle such as the vehicle 1 is not included in the group. On the basis of the difference between the positions of the mobile terminals 40 included in the group, the server CPU 54 may estimate a range of the compartment 61 of the vehicle 1, and may further estimate the size of the vehicle 1 on the basis of the estimated range of the compartment 61. The range of the compartment 61 and the size of the vehicle 1 to be estimated in this case are expected to be closer to actual ones than those to be estimated in a case where a single mobile terminal 40 is located in the vehicle 1. The size of the vehicle 1 to be estimated here may correspond to the size of the extracted vehicle 1.

Thereafter, the server CPU 54 may cause the flow to proceed to step ST46.

In step ST46, the server CPU 54 estimates the position of the vehicle relevant to the group on the road. Through the processes so far, the server CPU 54 has estimated the reference position of the vehicle and the kind and size of the vehicle. The server CPU 54 may estimate the position on the road for the estimated vehicle on the assumption that a center of the vehicle having the estimated size is at the reference position, for example. It is thereby possible for the server CPU 54 to estimate, on the basis of the difference between the positions of the mobile terminals 40 of occupants extracted as being located in the same vehicle 1, the size and the kind of the vehicle 1 and the position of the vehicle 1 on the road. The position of the vehicle 1 on the road to be estimated here is a position where the extracted mobile terminals 40 are allowed to be located, and may thus be closer to an actual position and more reliable than that to be estimated on the basis of the position of a single mobile terminal 40.

Figures 11, 12:
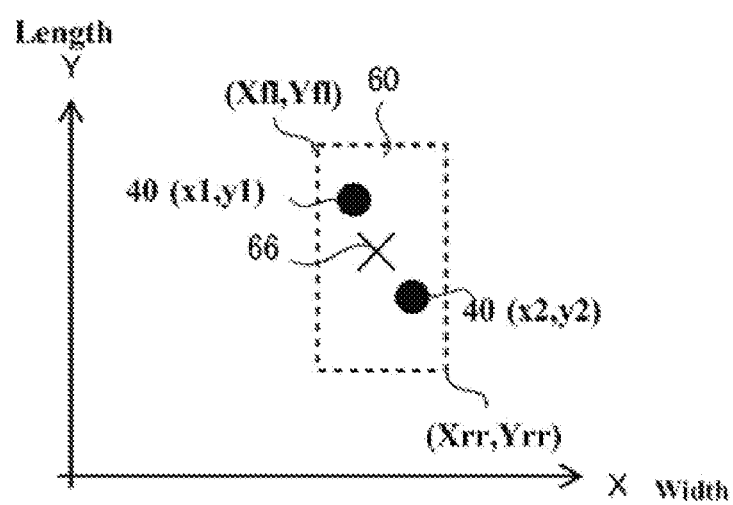
FIG. 11 is a table of correspondence between a kind and a size of a vehicle for each kind of vehicle.
FIG. 12 is a diagram describing a method of estimating the size of a vehicle on the basis of a difference between positions of mobile terminals.

FIG. 11 is a correspondence table 80 listing correspondence between the kind of the vehicle and the size for each kind of the vehicle.

In FIG. 11, "passenger car", "truck", and "motorcycle" are listed as the kind of the vehicle. Further, in FIG. 11, "pedestrian" is listed for reference. Furthermore, vehicle width data and front-rear length data are associated with each kind of the vehicle. For example, a vehicle width of "1.8 (meters)" and a front-rear length of "4 (meters)" are associated with the "passenger car". Such a correspondence table 80 may be stored in the server memory 53. In performing the process of step ST44 in FIG. 10, for example, the server CPU 54 may read the correspondence table 80 from the server memory 53 and estimate the size on the basis of the kind of the vehicle. However, the kind of the vehicle may be classified by a model code of the vehicle instead of the category of the vehicle as in FIG. 11. The size of the vehicle to be included in the correspondence table 80 may be set to have a larger vehicle width and a larger front-rear length than those of an actual vehicle corresponding to the listed kind of vehicle.

FIG. 12 is a diagram describing a method of estimating the size of the vehicle 1 on the basis of a difference between the positions of the mobile terminals 40.

The server CPU 54 may estimate the size of the vehicle 1 by the method of FIG. 12 in, for example, the process of step ST45 of FIG. 10.

The horizontal axis in FIG. 12 represents a road width direction corresponding to the vehicle width of the vehicle 1. The vertical axis represents a road extension direction corresponding to the front-rear length of the vehicle 1. FIG. 12 illustrates the positions of two mobile terminals 40 included in the same group.

Here, the server CPU 54 may calculate an average value of the positions of the two mobile terminals 40 in the vehicle width direction (x1 and x2) as a reference position 66 of the vehicle 1 in the road width direction. Further, the server CPU 54 may calculate an average value of the positions of the two mobile terminals 40 in the road extension direction (y1 and y2) as the reference position 66 of the vehicle 1 in the road extension direction.

For the vehicle 1, the server CPU 54 may set a margin value of the vehicle width to 0.5 meters, for example, and a margin value of the front-rear length to 3 meters, for example.

The server CPU 54 may subtract the margin value of the vehicle width from a value (x1) that is the smallest (the left side) of the positions of the two mobile terminals 40 in the road width direction, and may assume a position represented by the resulting value as the position of a left face of the vehicle 1. The server CPU 54 may add the margin value of the vehicle width to a value (x2) that is the largest (the right side) of the positions of the two mobile terminals 40 in the road width direction, and may assume a position represented by the resulting value as the position of a right face of the vehicle 1.

The server CPU 54 may add the margin value of the front-rear length to a value (y1) that is the largest (the front side) of the positions of the two mobile terminals 40 in the road extension direction, and may assume a position represented by the resulting value as the position of a front face of the vehicle 1. The server CPU 54 may subtract the margin value of the front-rear length from a value (y2) that is the smallest (the rear side) of the positions of the two mobile terminals 40 in the road extension direction, and may assume a position represented by the resulting value as the position of a rear face of the vehicle 1.

It is thereby possible for the server CPU 54 to estimate the size of the vehicle 1 in each of the front-rear direction and the left-right direction, the position of each of the front, rear, left, and right faces of the vehicle 1, and the position of the vehicle 1 on the road by calculation, as indicated by a broken-line frame in FIG. 12. The estimated size of the vehicle 1 may extend over a range enclosing the two mobile terminals 40 in FIG. 12 and extended therefrom by the predetermined margin values.

Next, examples of estimation of the vehicle data will be described with reference to FIGS. 13 to 18. FIGS. 13 to 18 each correspond to FIG. 7.

Figure 13:
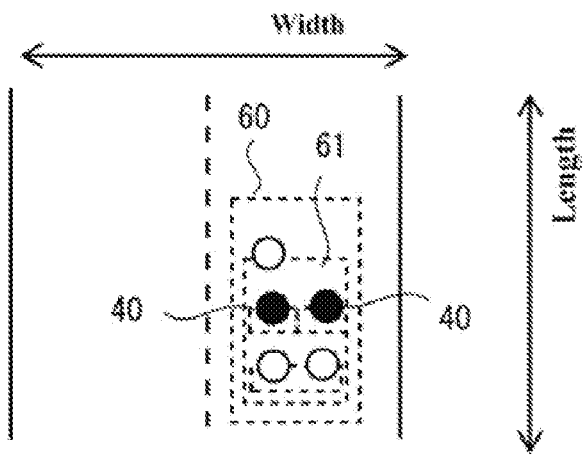
FIG. 13 is a diagram describing a first example of the position of a vehicle on the road estimated on the basis of a difference between the positions of the mobile terminals.
Figure 14:
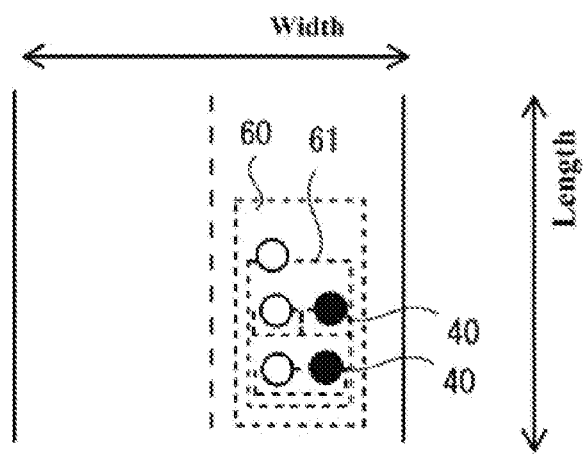
FIG. 14 is a diagram describing a second example of the position of a vehicle on the road estimated on the basis of a difference between the positions of the mobile terminals.
Figure 15:
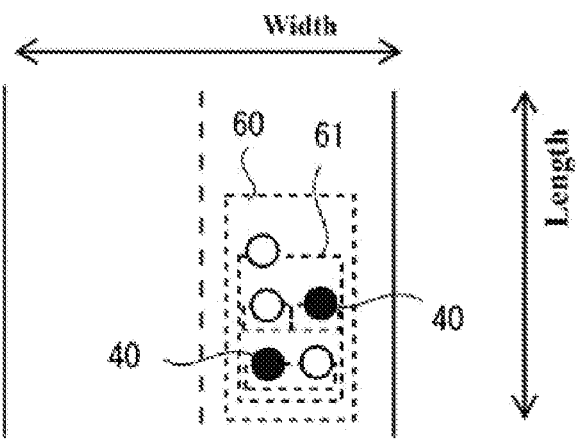
FIG. 15 is a diagram describing a third example of the position of a vehicle on the road estimated on the basis of a difference between the positions of the mobile terminals.

FIGS. 13 to 15 each illustrate an example in which the group includes the mobile terminals 40 only. In this case, in step ST43 in FIG. 10, the server CPU 54 may determine that no position data on a vehicle is included, and may cause the flow to proceed to step ST45.

Figure 16:
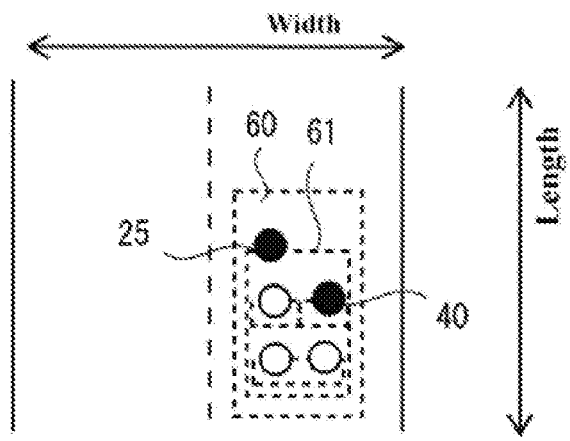
FIG. 16 is a diagram describing a fourth example of the position of a vehicle on the road estimated on the basis of a difference between the position of the vehicle itself and the position of the mobile terminal.
Figure 17:
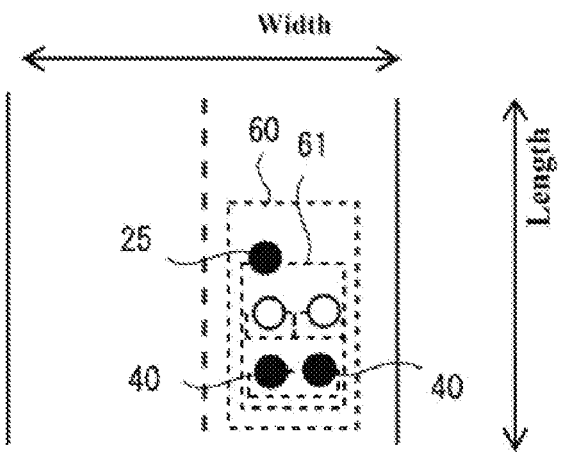
FIG. 17 is a diagram describing a fifth example of the position of a vehicle on the road estimated on the basis of a difference between the position of the vehicle itself and the positions of the mobile terminals.
Figure 18:
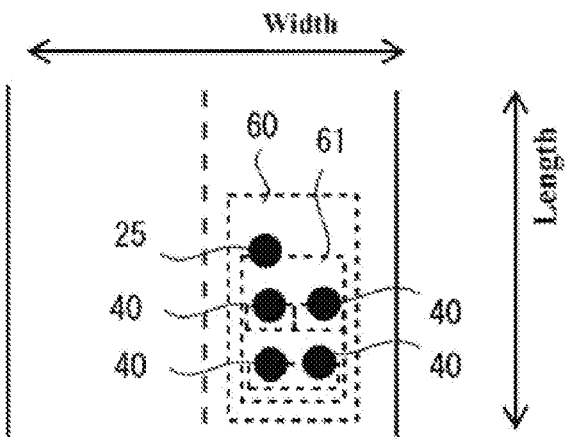
FIG. 18 is a diagram describing a sixth example of the position of a vehicle on the road estimated on the basis of the position of the vehicle itself and the positions of the mobile terminals.

FIGS. 16 to 18 each illustrate an example in which the group includes the mobile terminals 40 and the vehicle 1. In this case, in step ST43 in FIG. 10, the server CPU 54 may determine that position data on a vehicle is included, and may cause the flow to proceed to step ST44.

FIG. 13 is a diagram describing a first example of the position of the vehicle 1 on the road estimated on the basis of a difference between the positions of the mobile terminals 40.

For the vehicle 1 in FIG. 13, data on the position of the mobile terminal 40 of an occupant seated in the driver's seat 62 and data on the position of the mobile terminal 40 of an occupant seated in the front passenger seat 63 may have been acquired by the server apparatus 31. In this case, in accordance with the process of step ST45 in FIG. 10, the server CPU 54 may estimate, on the basis of the difference between the positions of the two mobile terminals 40 included in the group, the kind and the size of the vehicle in which the two mobile terminals 40 are located. For example, the server CPU 54 may estimate a position between the driver's seat 62 and the front passenger seat 63 as the reference position of the vehicle. Further, by the method in FIG. 12, the server CPU 54 may estimate the range enclosing the two mobile terminals 40 and extended therefrom by the predetermined margin values as the size of the vehicle and the position of the vehicle on the road. The position of the vehicle 1 on the road estimated in such a manner may be a position on a two-lane road where the vehicle 1 is traveling along the right lane without any portion of the vehicle 1 sticking out into the left lane. The estimated position of the vehicle 1 on the road may correspond favorably to an actual position of the vehicle 1 at least in the road width direction.

FIG. 14 is a diagram describing a second example of the position of the vehicle 1 on the road estimated on the basis of a difference between the positions of the mobile terminals 40.

For the vehicle 1 in FIG. 14, data on the position of the mobile terminal 40 of an occupant seated in the driver's seat 62 and data on the position of the mobile terminal 40 of an occupant seated in the rear passenger seat 64 may have been acquired by the server apparatus 31. In this case, in accordance with the process of step ST45 in FIG. 10, the server CPU 54 may estimate, on the basis of the difference between the positions of the two mobile terminals 40 included in the group, the kind and the size of the vehicle in which the two mobile terminals 40 are located. For example, the server CPU 54 may estimate a position between the driver's seat 62 and a region in the rear passenger seat 64 just behind the driver's seat 62 as the reference position of the vehicle. Further, by the method in FIG. 12, the server CPU 54 may estimate the range enclosing the two mobile terminals 40 and extended therefrom by the predetermined margin values as the size of the vehicle and the position of the vehicle on the road. The position of the vehicle 1 on the road estimated in such a manner may be a position on a two-lane road where the vehicle 1 is traveling along the right lane without any portion of the vehicle 1 sticking out into the left lane. The estimated position of the vehicle 1 on the road may correspond favorably to an actual position of the vehicle 1 at least in the road extension direction.

FIG. 15 is a diagram describing a third example of the position of the vehicle 1 on the road estimated on the basis of a difference between the positions of the mobile terminals 40.

For the vehicle 1 in FIG. 15, data on the position of the mobile terminal 40 of an occupant seated in the driver's seat 62 and data on the position of the mobile terminal 40 of an occupant seated in the rear passenger seat 64 on the opposite side from the driver's seat 62 may have been acquired by the server apparatus 31. In this case, in accordance with the process of step ST45 in FIG. 10, the server CPU 54 may estimate, on the basis of the difference between the positions of the two mobile terminals 40 included in the group, the kind and the size of the vehicle in which the two mobile terminals 40 are located. For example, the server CPU 54 may estimate a position between the driver's seat 62 and a region in the rear passenger seat 64 on the side of the front passenger seat 63 as the reference position of the vehicle. Further, by the method in FIG. 12, the server CPU 54 may estimate the range enclosing the two mobile terminals 40 and extended therefrom by the predetermined margin values as the size of the vehicle and the position of the vehicle on the road. The position of the vehicle 1 on the road estimated in such a manner may be a position on a two-lane road where the vehicle 1 is traveling along the right lane without any portion of the vehicle 1 sticking out into the left lane. The estimated position of the vehicle 1 on the road may correspond favorably to an actual position of the vehicle 1 in the road width direction and the road extension direction.

FIG. 16 is a diagram describing a fourth example of the position of the vehicle 1 on the road estimated on the basis of a difference between the position of the GNSS receiver 25 of vehicle 1 itself and the position of the mobile terminal 40.

For the vehicle 1 in FIG. 16, data on the position of the mobile terminal 40 of an occupant seated in the driver's seat 62 and data on the position of the GNSS receiver 25 of the vehicle 1 may have been acquired by the server apparatus 31. In this case, in accordance with the process of step ST44 in FIG. 10, the server CPU 54 may estimate, on the basis of the data on the vehicle 1 included in the group, the kind and the size of the vehicle in which the mobile terminal 40 is located. In many cases, an installation position of the GNSS receiver 25 in the vehicle 1 may be fixed upon manufacture of the vehicle 1. In this case, the server CPU 54 may estimate the position of the mobile terminal 40 as the position of the driver's seat 62. In this case, the position of the driver's seat 62 may be assumed as the reference position of the vehicle. Alternatively, the server CPU 54 may estimate the installation position of the GNSS receiver 25 in the vehicle 1 as the reference position of the vehicle. Further, the server CPU 54 may estimate the position of the vehicle 1 on the road in such a manner that the driver's seat 62 of the vehicle 1 estimated on the basis of the kind of the vehicle 1 overlaps with the position of the mobile terminal 40. In a case where the position data on the vehicle 1 has been obtained in this way, it is possible to estimate a position that is more reliable than that in FIG. 7 as the position of the vehicle 1 on the road, even if the number of mobile terminals 40 included in the group is one. The estimated position of the vehicle 1 on the road may be a position on a two-lane road where the vehicle 1 is traveling along the right lane without any portion of the vehicle 1 sticking out into the left lane. The estimated position of the vehicle 1 on the road may correspond favorably to an actual position of the vehicle 1 in the road width direction and the road extension direction.

FIG. 17 is a diagram describing a fifth example of the position of the vehicle 1 on the road estimated on the basis of a difference between the position of the GNSS receiver 25 of vehicle 1 itself and the positions of the mobile terminals 40.

For the vehicle 1 in FIG. 17, data on the positions of two mobile terminals 40 of two occupants seated in the rear passenger seat 64 and data on the position of the GNSS receiver 25 of the vehicle 1 may have been acquired by the server apparatus 31. In a case of the vehicle 1 traveling under the automatic driving of level 5, there may be no driver in the driver's seat 62. In this case, in accordance with the process of step ST44 in FIG. 10, the server CPU 54 may estimate, on the basis of the data on the vehicle 1 included in the group, the kind and the size of the vehicle in which the mobile terminals 40 are located. It is possible for the server CPU 54 to estimate the two mobile terminals 40 to be in the rear passenger seat 64 on the basis of the fact that the difference between the position of the GNSS receiver 25 of the vehicle 1 and the positions of the two mobile terminals 40 is larger than a distance from the position of the GNSS receiver 25 of the vehicle 1 to the driver's seat 62 and the front passenger seat 63 in the vehicle data. The server CPU 54 may then estimate the position of the vehicle 1 on the road in such a manner that the rear passenger seat 64 of the vehicle 1 estimated on the basis of the kind of the vehicle 1 overlaps with the positions of the two mobile terminals 40. In a case where the position data on the vehicle 1 has been obtained in this way, it is possible to estimate the positions, in the compartment 61, of the mobile terminals 40 included in the group with high accuracy. As a result, the position of the vehicle 1 on the road becomes more reliable than that in each of FIGS. 13 and 14. The estimated position of the vehicle 1 on the road may be a position on a two-lane road where the vehicle 1 is traveling along the right lane without any portion of the vehicle 1 sticking out into the left lane. The estimated position of the vehicle 1 on the road may correspond favorably to an actual position of the vehicle 1 in the road width direction and the road extension direction.

FIG. 18 is a diagram describing a sixth example of the position of the vehicle 1 on the road estimated on the basis of a difference between the position of the GNSS receiver 25 of vehicle 1 itself and the positions of the mobile terminals 40.

For the vehicle 1 in FIG. 18, data on the positions of four mobile terminals 40 of four occupants seated in the driver's seat 62, the front passenger seat 63, and the rear passenger seat 64 and data on the position of the GNSS receiver 25 of the vehicle 1 may have been acquired by the server apparatus 31. In this case, in accordance with the process of step ST44 in FIG. 10, the server CPU 54 may estimate, on the basis of the data on the vehicle 1 included in the group, the kind and the size of the vehicle in which the mobile terminals 40 are located. Further, the server CPU 54 may estimate the position of the vehicle 1 on the road in such a manner that the driver's seat 62, the front passenger seat 63, and the rear passenger seat 64 of the vehicle 1 estimated on the basis of the kind of the vehicle 1 overlap with the positions of the four mobile terminals 40. In a case where the position data on the vehicle 1 has been obtained and the positions of the mobile terminals 40 have been obtained for all the seats in this way, it is possible to estimate a position that is more reliable than that in each of FIGS. 13 to 17 as the position of the vehicle 1 on the road. The estimated position of the vehicle 1 on the road may be a position on a two-lane road where the vehicle 1 is traveling along the right lane without any portion of the vehicle 1 sticking out into the left lane. The estimated position of the vehicle 1 on the road may correspond favorably to an actual position of the vehicle 1 in the road width direction and in the road extension direction.

In this way, in a case where respective pieces of the position data on the mobile terminals 40 of occupants extracted as being located in the same vehicle 1 have a difference in the road width direction, it is possible for the server CPU 54 to estimate that the kind of the vehicle 1 is a kind that includes the compartment 61 in which multiple occupants are able to be seated next to each other along the vehicle width direction. Further, it is possible for the server CPU 54 to estimate the size or the kind of the vehicle 1 or the position of the vehicle 1 on the road on the assumption that the vehicle 1 is of a kind that includes the compartment 61 and is large in vehicle width.

In a case where the respective pieces of position data on the mobile terminals 40 of occupants included in the group have a difference in the road extension direction and no difference in the road width direction as in FIG. 14, for example, there is a possibility of determination by the server CPU 54 that the vehicle is a motorcycle, on the basis of the corresponding table 80 in FIG. 11. In this case, the server CPU 54 may determine whether the difference in the road extension direction between the positions of two mobile terminals 40 of occupants seated next to each other along the front-rear direction is, for example, less than or equal to a proximity threshold, such as 0.4 meters. If the difference between the positions of the two mobile terminals 40 is less than or equal to the proximity threshold, the server CPU 54 may determine that the vehicle is a motorcycle, not a standard-sized car, on the basis of the correspondence table 80 in FIG. 11. A motorcycle is a kind of vehicle that is small in the road width direction and large in front-rear length, and allows occupants to be seated closely next to each other along the front-rear direction. In this case, the server CPU 54 is to estimate the position on the road for a motorcycle on the basis of the vehicle width and the front-rear length listed in the corresponding table 80 in FIG. 11.

The mobile terminal 40 carried by any occupant of the vehicle 1 can sometimes change position in the compartment 61. In a case where the mobile terminal 40 changes position in the vehicle 1 while the vehicle 1 is traveling, the position data on the mobile terminal 40 can include an error due to the change in position thereof in the vehicle. Even in such a case, the server CPU 54 is able to determine the change in position of the mobile terminal 40 itself in the vehicle with reference to a position of another mobile terminal 40 included in the group. The server CPU 54 is able to distinguish the change in position of the mobile terminal 40 itself in the vehicle from a change in position of the mobile terminal 40 caused by another factor. In this case, the server CPU 54 may determine whether, with respect to one mobile terminal 40, there has been a change in relative position of another mobile terminal 40 in the position data on the mobile terminals 40 of occupants included in the group of the same vehicle 1. If there has been such a positional change, the server CPU 54 may estimate that the vehicle 1 includes a compartment 61 having a width that allows occupants to be seated next to each other along the direction of the change in the relative position. As a result, the server CPU 54 is able to improve the reliability of the position of the vehicle 1 on the road on the basis of the change in position of the mobile terminal 40 within the compartment 61.

As described above, in the present example embodiment, the server communication device 51 may communicate with multiple mobile terminals 40 of occupants traveling in one or more vehicles 1 and receive respective pieces of position data on the mobile terminals 40. In the server apparatus 31 serving as the vehicle traveling control apparatus, the server CPU 54 as the processor generates, from the respective pieces of position data on the mobile terminals 40 that have been acquired, data indicating respective traveling speeds or respective changes in traveling speed. Further, the server CPU 54 extracts the mobile terminals 40 of occupants assumed to be located in the same one vehicle 1 on the basis of the degree of correlation in terms of the respective traveling speeds or the respective changes in traveling speed. Further, the server CPU 54 estimates, on the basis of a difference between the positions of the mobile terminals 40 of the occupants extracted as being in the same one vehicle 1, the size or the kind of the same one vehicle 1.

In this way, according to the present example embodiment, it is possible to estimate, for traveling control on vehicles 1, the size or the kind of any vehicle 1 having no position detection function on the basis of position data on the mobile terminals 40 of occupants of the vehicle 1. Further, according to the present example embodiment, it is possible to estimate the position of the vehicle 1 on the road on the basis of the size or the kind estimated for the vehicle 1 and the position data on the mobile terminals 40. Furthermore, according to the present example embodiment, by using the position on the road estimated for the vehicle 1 having no position detection function, for example, it is possible to control traveling of vehicles 1 so as not to interfere with the vehicle 1 having no position detection function.

For example, according to the present example embodiment, the above-described data on the vehicle 1 is estimated on the basis of the position data on multiple mobile terminals 40, not on the basis of the position data on a single mobile terminal 40. In the present example embodiment, a range of a region in the vehicle 1 where occupants are able to be seated may be estimated using a difference between the positions of the mobile terminals 40 and, on the basis of a result thereof, the kind or the size of the vehicle 1 may be estimated. The kind or the size of the vehicle 1 to be estimated may not be a fixed one. In contrast, for example, in a case of estimating data on the vehicle 1 on the basis of position data on a single mobile terminal 40, the kind or the size of the vehicle 1 is to be basically fixed. This also applies to the position of the vehicle 1 on the road. In a case of using such fixed data, the reliability of the kind or the size of the vehicle 1 or the position of the vehicle 1 on the road can decrease.

According to the present example embodiment, it is possible to estimate, regarding a vehicle 1 having no position detection function, the size or the kind, or the position on the road so as to be reliable enough to be usable in controlling vehicle traveling, for example.

Referring to FIG. 1, for example, the other vehicle 2 merging from the side road L3 may basically merge into the lane L2. In this case, if the server apparatus 31 simply recognizes the presence of the other vehicle 2 on the side road L3, basically, the server CPU 54 may simply set a merging range 3 on the lane L2 for the other vehicle 2 to merge thereinto.

In contrast, the server apparatus 31 of the present example embodiment continuously acquires the position or movement of the other vehicle 2 merging from the side road L3 as a change in position of the mobile terminals 40 located in the vehicle 2. As a result, on the basis of the change in position (i.e., movement) of the mobile terminals 40, the server CPU 54 is able to estimate that the other vehicle 2 merging is, or can be, at a position 4 such that a portion of the vehicle 2 sticks out into a region in the passing lane L1 from the lane L2 into which the vehicle 2 merges. For the vehicles 1 traveling along the passing lane L1, the server CPU 54 is able to so control the traveling thereof as to avoid interfering with the other vehicle 2 that can stray onto the passing lane L1 from the lane L2 into which the vehicle 2 merges.

Further, according to the present example embodiment, position data on not only the mobile terminals 40 but also the vehicles 1 may be acquired, and the vehicle 1 in which occupants carrying relevant mobile terminals 40 are located may be extracted on the basis of the degree of correlation with the traveling speeds or changes in traveling speed in the position data on the vehicles 1. In this case, according to the present example embodiment, the kind and the size of the vehicle 1 may be selected on the basis of not only a difference between the positions of the mobile terminals 40 but also data on the extracted vehicle 1. This helps to make the estimated kind and size of the vehicle 1 more reliable.

In the example embodiment described above, the vehicle estimation control in FIG. 8 and the traveling control in FIG. 5 may be executed by the server CPU 54 of the server apparatus 31.

In another example, some processes of the vehicle estimation control in FIG. 8 and some processes of the traveling control in FIG. 5 may be executed by the traveling control apparatus 15 of the vehicle 1, for example. In such a case, the server apparatus 31 and the vehicle 1 may cooperate with each other to execute the vehicle estimation control in FIG. 8 and the traveling control in FIG. 5.

Further, the vehicle estimation control in FIG. 8 and the traveling control in FIG. 5 may be executed by multiple server apparatuses 31 in a distributed manner, not by a single server apparatus 31. Such multiple server apparatuses 31 may be disposed in a distributed manner in correspondence with multiple base stations 30 for 5G communication provided along a road.

Second Example Embodiment

Next, a second example embodiment of the disclosure will be described. In the foregoing example embodiment, the server CPU 54 of the server apparatus 31 may execute the vehicle estimation control in FIG. 8 as some processes of the traveling control in FIG. 5.

The present example embodiment is an example in which the traveling control apparatus 15 of the vehicle 1 may execute the vehicle estimation control in FIG. 8 as some processes of traveling control on the own vehicle.

The following description includes description of differences from the foregoing example embodiment. Features similar to those in the foregoing example embodiment are denoted with the same reference signs as those in the foregoing example embodiment, and descriptions thereof are omitted.

Figure 19:
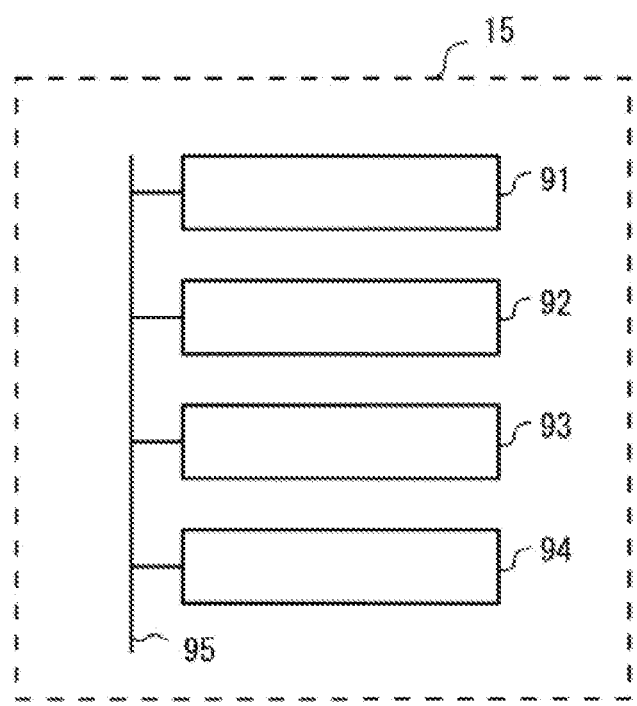
FIG. 19 is a block diagram of a traveling control apparatus to be applied to a vehicle according to one example embodiment of the disclosure.

FIG. 19 is a block diagram of the traveling control apparatus 15 of the vehicle 1 according to the second example embodiment of the disclosure.

The traveling control apparatus 15 of the vehicle 1 in FIG. 19 may include an input and output unit 91, a timer 92, a memory 93, an electronic control unit (ECU) 94, and an internal bus 95. The input and output unit 91, the timer 92, the memory 93, and the ECU 94 may be coupled to the internal bus 95.

The input and output unit 91 may be coupled to the vehicle network of the control system 10 of the vehicle 1. The input and output unit 91 may supply and receive data to and from another control apparatus coupled to the vehicle network.

The timer 92 may measure a time and a time period. The time of the timer 92 may be calibrated by a time based on radio waves from a GNSS satellite, for example.

The memory 93 may hold a program to be executed by the ECU 94, and data. The memory 93 may include, for example, a nonvolatile semiconductor memory, an HDD, or a RAM.

The ECU 94 may read the program held by the memory 93 and execute the program. This enables a processor to be implemented. The processor controls the traveling of the vehicle 1. In one embodiment, the ECU 94 may serve as a "processor" of the vehicle. The various control apparatuses provided in the control system 10 of the vehicle 1 in FIG. 2 may have a configuration similar to that in FIG. 19.

Figure 20:
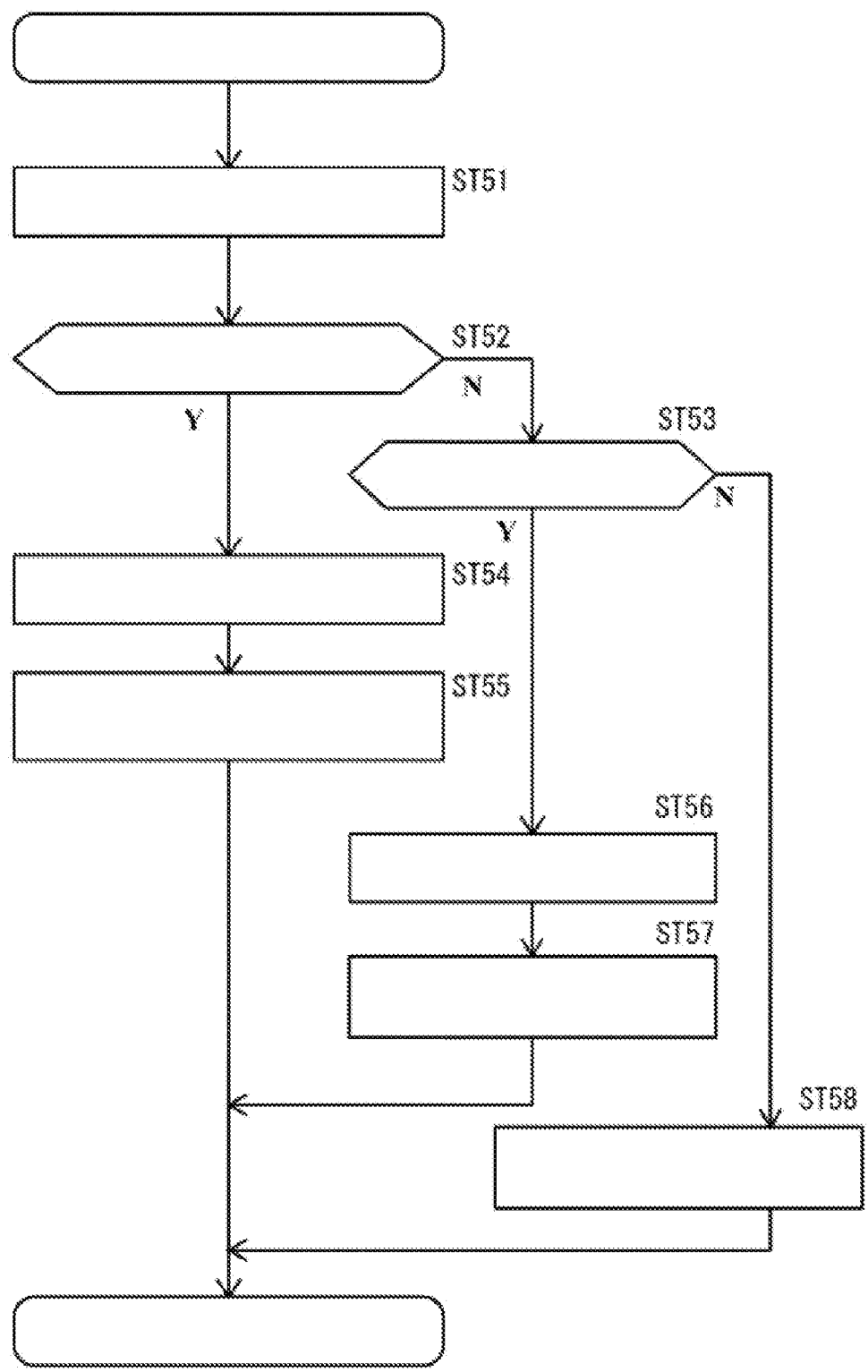
FIG. 20 is a flowchart of own-vehicle traveling control to be performed by the traveling control apparatus in FIG. 19.

FIG. 20 is a flowchart of own-vehicle traveling control to be performed by the traveling control apparatus 15 in FIG. 19.

The ECU 94 of the traveling control apparatus 15 in FIG. 19 may repeatedly execute the own-vehicle traveling control in FIG. 20.

The various control apparatuses provided in the control system 10 of the vehicle 1 may cooperate with each other to repeatedly execute the own-vehicle traveling control in FIG. 20.

In step ST51, the ECU 94 may acquire setting data for traveling control on the own vehicle. Assume here that the vehicle 1 is able to perform traveling control in accordance with the driver's operations, to perform traveling control by assisting the driver's operations, and to perform traveling control based on automatic driving without the driver's operations. The ECU 94 may acquire the setting data for those kinds of traveling control from the memory 93, for example.

In step ST52, the ECU 94 may determine whether the setting data for the traveling control on the own vehicle is automatic driving. In a case where the automatic driving is set (step ST52: Y), the ECU 94 may cause the flow to proceed to step ST54. Otherwise (step ST52: N), the ECU 94 may cause the flow to proceed to step ST53.

In step ST53, the ECU 94 may determine whether the setting data for the traveling control on the own vehicle is driving assist. In a case where the driving assist is set (step ST53: Y), the ECU 94 may cause the flow to proceed to step ST56. Otherwise (step ST53: N), that is, in a case where the driver's manual driving is set, the ECU 94 may cause the flow to proceed to step ST58.

In step ST54, to start traveling control based on automatic driving, the ECU 94 may receive and acquire data usable for the traveling control based on automatic driving from the server apparatus 31.

At this time, the ECU 94 may receive and acquire data on, for example, the positions of the mobile terminals 40 collected by the server apparatus 31 from the server apparatus 31. To the vehicle 1 that has made a request, the server apparatus 31 may transmit the data on the positions of the mobile terminals 40 having position data within a predetermined range from the vehicle 1 as the request sender. The data acquired may be stored in the memory 93. The data to be acquired may include position data on the other vehicle 2 within a predetermined range. The predetermined range may be set to be wider than an external range detectable by the own vehicle sensors 25 to 28 of the vehicle 1.

The ECU 94 may receive and acquire, not only from the server apparatus 31 but also from any other vehicle 2 that is able to perform V2X communication, data on the position of the other vehicle 2, for example.

In step ST55, on the basis of detection data from the own vehicle sensors 25 to 28, the ECU 94 may generate by itself a traveling control value for automatic driving, and execute traveling control on the own vehicle using the generated traveling control value.

At this time, the ECU 94 may generate the traveling control value for automatic driving by using the data acquired from the server apparatus 31 in combination. The ECU 94 may execute the vehicle estimation control in FIG. 8 using, for example, the data on the positions of the mobile terminals 40 acquired from the server apparatus 31. It is thereby possible for the ECU 94 to generate data on the kind, size, and position on the road for the other vehicle 2 located around the own vehicle and having no function of communicating with the server apparatus 31. The ECU 94 may control the traveling of the own vehicle by generating a traveling control value for automatic driving that allows the own vehicle to travel while avoiding the position of the other vehicle 2 on the road on which data has been generated. This helps to keep the vehicle 1 traveling under automatic driving from interfering with the other vehicle 2 having no function of communicating with the server apparatus 31.

The ECU 94 may also receive a traveling control value for the own vehicle from the server apparatus 31 in step ST54. In such a case also, the ECU 94 may execute the vehicle estimation control in FIG. 8 using, for example, the data on the positions of the mobile terminals 40 acquired by itself. This makes it possible for the ECU 94 to generate and update the traveling control value to be used for traveling control on the own vehicle, while omitting some of processes for generating the traveling control value. The ECU 94 is able to update the traveling control value to be used for traveling control on the own vehicle in such a manner as to avoid a latest position of the other vehicle 2 that was not considered when the server apparatus 31 generated the traveling control value, for example.

In step ST56, to start traveling control based on driving assist, the ECU 94 may receive and acquire data usable for the traveling control based on driving assist from the server apparatus 31.

At this time, the ECU 94 may receive and acquire data on, for example, positions of the mobile terminals 40 collected by the server apparatus 31 from the server apparatus 31. To the vehicle 1 that has made a request, the server apparatus 31 may transmit the data on the positions of the mobile terminals 40 having position data within a predetermined range from the vehicle 1 as the request sender. The data acquired may be stored in the memory 93. The data to be acquired may include position data on the other vehicle 2 within a predetermined range. The predetermined range may be set to be wider than the external range detectable by the own vehicle sensors 25 to 28 of the vehicle 1.

The ECU 94 may receive and acquire, not only from the server apparatus 31 but also from any other vehicle 2 that is able to perform V2X communication, data on the position of the other vehicle 2, for example. Thereafter, the ECU 94 may end this control.

In step ST57, on the basis of the driver's operations and the detection data from the own vehicle sensors 25 to 28, the ECU 94 may generate by itself a traveling control value for driving assist, and execute traveling control on the own vehicle using the generated traveling control value.

At this time, the ECU 94 may generate the traveling control value for driving assist by using the data acquired from the server apparatus 31 in combination. The ECU 94 may execute the vehicle estimation control in FIG. 8 using, for example, the data on the positions of the mobile terminals 40 acquired from the server apparatus 31. It is thereby possible for the ECU 94 to generate data on the kind, size, and position on the road for the other vehicle 2 located around the own vehicle and having no function of communicating with the server apparatus 31. The ECU 94 may control the traveling of the own vehicle by generating a traveling control value for driving assist that allows the own vehicle to travel while avoiding the position of the other vehicle 2 on the road on which data has been generated. This helps to keep the vehicle 1 traveling under driving assist from interfering with the other vehicle 2 having no function of communicating with the server apparatus 31, while allowing the vehicle 1 to travel basically in accordance with the driver's operations.

The ECU 94 may also receive a traveling control value for the own vehicle from the server apparatus 31 in step ST54. In such a case also, the ECU 94 may execute the vehicle estimation control in FIG. 8 using, for example, the data on the positions of the mobile terminals 40 acquired by itself. This makes it possible for the ECU 94 to generate and update the traveling control value to be used for traveling control on the own vehicle, while omitting some of the processes for generating the traveling control value. The ECU 94 is able to update the traveling control value to be used for traveling control on the own vehicle in such a manner as to avoid a latest position of the other vehicle 2 that was not considered when the server apparatus 31 generated the traveling control value.

Thereafter, the ECU 94 may end this control.

In step ST58, the ECU 94 may generate by itself a traveling control value to follow only the driver's operation data, and execute traveling control on the own vehicle using the generated traveling control value.

Thereafter, the ECU 94 may end this control.

As described above, in the vehicle 1 according to the present example embodiment, the ECU 94 of the traveling control apparatus 15 may receive and acquire, via the external communication control apparatus 17, data on the positions of mobile terminals 40 of occupants traveling in one or more other vehicles 2. Thereafter, the ECU 94 of the traveling control apparatus 15 may execute the vehicle estimation control in FIG. 8 on the basis of the data on the positions of the mobile terminals 40 located in the same other vehicle 2, and generate the traveling control value to be used for traveling control on the own vehicle. In the vehicle estimation control in FIG. 8, the ECU 94 extracts the mobile terminals 40 of occupants assumed to be located in the same other vehicle 2 on the basis of the degree of correlation in terms of traveling speeds or changes in traveling speed in the position data on the mobile terminals 40 acquired. Further, the ECU 94 estimates, on the basis of a difference between the positions of the mobile terminals 40 of the occupants extracted as being located in the same other vehicle 2, the size or the kind of the other vehicle 2. Further, the ECU 94 estimates the position of the other vehicle 2 on the road on the basis of the estimated size or kind of the other vehicle 2 and the positions of the mobile terminals 40 extracted for the other vehicle 2, and may generate the traveling control value to be used for traveling control on the own vehicle so as not to interfere with the other vehicle 2. The ECU 94 may control the traveling of the own vehicle using the traveling control value generated.

In this way, according to the present example embodiment, it is possible to estimate, for traveling control on vehicles 1, the size or the kind of any vehicle 1 having no position detection function on the basis of position data on the mobile terminals 40 of occupants of the vehicle 1. Further, according to the present example embodiment, it is possible to estimate the position of the vehicle 1 on the road on the basis of the size or the kind estimated for the vehicle 1 and the position data on the mobile terminals 40. Furthermore, according to the present example embodiment, by using the position on the road estimated for the vehicle 1 having no position detection function, for example, it is possible to control traveling of vehicles 1 so as not to interfere with the vehicle 1 having no position detection function.

For example, according to the present example embodiment, the above-described data on the vehicle 1 is estimated on the basis of the position data on multiple mobile terminals 40, not on the basis of the position data on a single mobile terminal 40. In the present example embodiment, a range of a region in the vehicle 1 where occupants are able to be seated may be estimated using a difference between the positions of the mobile terminals 40 and, on the basis of a result thereof, the kind or the size of the vehicle 1 may be estimated. The kind or the size of the vehicle 1 to be estimated may not be a fixed one. In contrast, for example, in a case of estimating data on the vehicle 1 on the basis of position data on a single mobile terminal 40, the kind or the size of the vehicle 1 is to be basically fixed. This also applies to the position of the vehicle 1 on the road. In a case of using such fixed data, the reliability of the kind or the size of the vehicle 1 or the position of the vehicle 1 on the road can decrease.

According to the present example embodiment, it is possible to estimate, regarding a vehicle 1 having no position detection function, the size or the kind, or the position on the road so as to be reliable enough to be usable in controlling vehicle traveling, for example.

Further, the vehicle 1 according to the present example embodiment is able to acquire not only the position data on the mobile terminals 40 but also the position data on the vehicles 1 from the server apparatus 31, for example. On the basis of the degree of correlation with the traveling speeds or changes in traveling speeds in the position data on the vehicles 1, the ECU 94 extracts the vehicle 1 in which occupants carrying relevant mobile terminals 40 are located. In this case, according to the present example embodiment, the kind and the size of the vehicle 1 may be selected on the basis of not only a difference between the positions of the mobile terminals 40 but also data on the extracted vehicle 1. This helps to make the estimated kind and size of the vehicle 1 more reliable.

In the example embodiment described above, the vehicle estimation control in FIG. 8 may be executed by the ECU 94 of the traveling control apparatus 15 of the vehicle 1.

In another example, some processes of the vehicle estimation control in FIG. 8 may be executed by the ECUs 94 of the various control apparatuses included in the control system 10 of the vehicle 1. Alternatively, the ECUs 94 of any two or more control apparatuses included in the control system 10 of the vehicle 1 may execute the vehicle estimation control in FIG. 8 in cooperation with each other.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

According to the example embodiments described above, in order to execute traveling control to avoid interference with the other vehicle 2 having no position detection function, the vehicle 1 that travels under automatic driving including driving assist may estimate data such as the position of the other vehicle 2 on the basis of the position data on the mobile terminals 40.

In another example, the data such as the position of the other vehicle 2 estimated on the basis of the position data on the mobile terminals 40 is usable for traveling control on the vehicle 2 itself in which the mobile terminals 40 are located. In such a case also, the other vehicle 2 is expected to become able to execute highly accurate traveling control on the basis of the position with improved reliability, as compared with a case of executing traveling control on the basis of only the position detected by its own position detection function. Improved position accuracy of the own vehicle helps to increase the possibility of being able to avoid interference with the vehicle 1 around the own vehicle.

As described above, the foregoing embodiments disclose a vehicle traveling control apparatus. In the vehicle traveling control apparatus, the server CPU 54 or the ECU 94, each serving as the processor configured to execute control using the data received from the mobile terminals 40, may execute the various processes for controlling vehicle traveling as described above. In this case, the vehicle 1 or the server apparatus 31 may also serve as a vehicle data estimation apparatus.

In a case where there has been a change in relative position in the position data of the mobile terminals 40 of the occupants extracted as being located in the same vehicle 1, the server CPU 54 or the ECU 94, for example, may estimate that the vehicle 1 is of a kind that allows occupants to be seated next to each other along the direction of the change relative position. In this case, the server CPU 54 or the ECU 94 may estimate the size or the kind of the vehicle or the position of the vehicle on the road on the assumption that the vehicle is of a kind that has a width in the direction of the change in relative position.

Further, one of the server CPU 54 and the ECU 94 may execute some of the foregoing various processes for controlling vehicle traveling, not all of the processes. In such a case, the remaining processes may be executed by the other of the server CPU 54 and the ECU 94.

For example, the server CPU 54 may execute one or more of: a process of acquiring pieces of position data including position data received from the mobile terminals 40 of occupants traveling in one or more vehicles; a process of extracting the mobile terminals 40 of occupants assumed to be located in the same one vehicle on the basis of the degree of correlation in terms of traveling speeds or changes in traveling speed in the position data on the mobile terminals acquired; a process of estimating a size or a kind of the same one vehicle on the basis of a difference between positions of those mobile terminals 40 of occupants extracted as being located in the same one vehicle; and a process of controlling traveling of the one or more vehicles by estimating a position of the same one vehicle on a road on the basis of the size or the kind of the same one vehicle estimated and the position data on the mobile terminals extracted.

The server CPU 54 illustrated in FIG. 3 and the ECU 94 illustrated in FIG. 19 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the server CPU 54 and the ECU 94. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM.

The ASIC is an integrated circuit (IC) customized to perform, and the FPGA is an integrated circuit designed to be configured after manufacturing in order to perform, all or a part of the functions of the server CPU 54 and the ECU 94.

The invention claimed is:

1. A vehicle traveling control apparatus comprising: a processor configured to:
   acquire position data repeatedly from a first plurality of mobile terminals via a communication network, the position data indicating respective positions of the first plurality of mobile terminals;
   determine, based on the acquired position data, a second plurality of mobile terminals from among the first plurality of mobile terminals, the second plurality of mobile terminals having a degree of correlation in movement with each other equal to or greater than a predetermined value;
   determine a size of an area occupied by a first vehicle that moves together with the second plurality of mobile terminals, based only on respective positions of the second plurality of mobile terminals at the same time, the area including all positions of the second plurality of mobile terminals at the same time, the first vehicle being not communicable with the vehicle traveling control apparatus; and
   control travel of a second vehicle, which is communicable with the vehicle traveling control apparatus, such that the second vehicle does not interfere with the area based on the determined size of the area, the second vehicle being different from the first vehicle.

2. A vehicle comprising:
   a processor configured to:
   acquire position data repeatedly from a first plurality of mobile terminals via a communication network, the position data indicating respective positions of the first plurality of mobile terminals;
   determine, based on the acquired position data, a second plurality of mobile terminals from among the first plurality of mobile terminals, the second plurality of mobile terminals having a degree of correlation in movement with each other equal to or greater than a predetermined value;
   determine a size of an area that moves together with the second plurality of mobile terminals, based only on respective positions of the second plurality of mobile terminals at the same time, the area including all positions of the second plurality of mobile terminals at the same time, the first vehicle being not communicable with the vehicle traveling control apparatus; and
   control travel of the vehicle, which is communicable with the vehicle traveling control apparatus, such that the vehicle does not interfere with the area based on the determined size of the area.

3. The vehicle traveling control apparatus according to claim 1, wherein the processor is further configured to determine the area as a rectangle, when viewed from vertically above, the rectangle being defined by a first side and a second side parallel to a longitudinal direction of a road, and a third side and a fourth side parallel to a width direction of the road.

4. The vehicle traveling control apparatus according to claim 3, wherein the processor is further configured to:
   (i) when the second plurality of mobile terminals includes only a first mobile terminal and a second mobile terminal different from the first mobile terminal, and (ii) when a difference in the width direction of the road between a first position of the first mobile terminal and a second position of the second mobile terminal at the same time is zero, determine whether a difference in the longitudinal direction of the road between the first position and the second position is equal to or less than a predetermined threshold;
   in response to determining that the difference in the longitudinal direction of the road between the first position and the second position is equal to or less than the predetermined threshold, determine lengths of the third side and the fourth side as a first value; and
   in response to determining that the difference in the longitudinal direction of the road between the first position and the second position is greater than the predetermined threshold, determine the lengths of the third side and the fourth side as a second value greater than the first value.

5. The vehicle traveling control apparatus according to claim 4, wherein the processor is further configured to:
   store the first value in association with a width of a motorcycle in advance; and
   store the second value in association with a width of a four-wheeled vehicle in advance.

6. The vehicle according to claim 2, wherein the processor is further configured to:
   determine the area as a rectangle, when viewed from vertically above, the rectangle being defined by a first side and a second side parallel to a longitudinal direction of a road, and a third side and a fourth side parallel to a width direction of the road.

7. The vehicle according to claim 6, wherein the processor is further configured to:
   (i) when the second plurality of mobile terminals includes only a first mobile terminal and a second mobile terminal different from the first mobile terminal, and (ii) when a difference in the width direction of the road between a first position of the first mobile terminal and a second position of the second mobile terminal at the same time is zero, determine whether a difference in the longitudinal direction of the road between the first position and the second position is equal to or less than a predetermined threshold;
   in response to determining that the difference in the longitudinal direction of the road between the first position and the second position is equal to or less than the predetermined threshold, determine lengths of the third side and the fourth side as a first value; and
   in response to determining that the difference in the longitudinal direction of the road between the first position and the second position is greater than the predetermined threshold, determine the lengths of the third side and the fourth side as a second value greater than the first value.

8. The vehicle traveling control apparatus according to claim 7, wherein the processor is further configured to:
   store the first value in association with a width of a motorcycle in advance; and
   store the second value in association with a width of a four-wheeled vehicle in advance.

* * * * *